United States Patent [19]
Hoda et al.

[11] Patent Number: 6,094,282
[45] Date of Patent: Jul. 25, 2000

[54] CAMERA CAPABLE OF RECORDING AND REPRODUCING A PHOTOGRAPHED IMAGE

[75] Inventors: Takeo Hoda; Yoshihiro Tanaka; Hiroshi Ishibe; Hirokazu Naruto; Hirokazu Yamada; Nobuyuki Taniguchi; Katsuyuki Nanba; Dai Shintani, all of Osaka, Japan

[73] Assignee: Minolta Co., Ltd., Osaka, Japan

[21] Appl. No.: 08/174,214

[22] Filed: Dec. 28, 1993

Related U.S. Application Data

[63] Continuation of application No. 07/524,374, May 15, 1990, abandoned.

[30] Foreign Application Priority Data

| May 17, 1989 | [JP] | Japan | 1-123184 |
|---|---|---|---|
| May 17, 1989 | [JP] | Japan | 1-123185 |
| May 17, 1989 | [JP] | Japan | 1-123186 |
| May 17, 1989 | [JP] | Japan | 1-123187 |
| May 17, 1989 | [JP] | Japan | 1-123188 |
| Dec. 29, 1989 | [JP] | Japan | 1-340038 |

[51] Int. Cl.⁷ ................................................. H04N 5/225
[52] U.S. Cl. ................................. 358/909.1; 358/296
[58] Field of Search .................... 358/335, 906, 358/310, 909.1, 302, 296; 360/35.1; 346/107 R, 110 R, 76; 400/120; 386/46, 107, 117; 348/373; 396/429; H04N 5/225

[56] References Cited

U.S. PATENT DOCUMENTS

| 4,131,919 | 12/1978 | Lloyd et al. ................................. 360/9 |
|---|---|---|
| 4,262,301 | 4/1981 | Erlichman ................................. 358/78 |
| 4,489,351 | 12/1984 | d'Alayer de Costemore d'Arc .... 358/213 |
| 4,584,601 | 4/1986 | Suzuki et al. ............................... 358/80 |
| 4,590,490 | 5/1986 | Takanashi et al. ......................... 346/76 |
| 4,803,560 | 2/1989 | Matsunaga et al. ...................... 358/236 |
| 4,827,347 | 5/1989 | Bell ......................................... 358/906 |
| 4,860,113 | 8/1989 | Miyamoto et al. ................... 358/909.1 |
| 4,888,648 | 12/1989 | Takeuchi et al. ........................ 358/335 |
| 4,899,224 | 2/1990 | Ooka et al. .............................. 358/332 |
| 4,937,676 | 6/1990 | Finelli et al. ............................ 358/909 |
| 4,942,477 | 7/1990 | Nakamura ............................... 358/909 |
| 5,016,107 | 5/1991 | Sasson et al. ........................... 358/906 |
| 5,051,838 | 9/1991 | Cho et al. ................................ 358/909 |
| 5,067,029 | 11/1991 | Takahashi ............................... 358/906 |
| 5,379,159 | 1/1995 | Lemelson ................................ 358/906 |

FOREIGN PATENT DOCUMENTS

| 61-189785 | 8/1986 | Japan . |
|---|---|---|
| 61-189785 | 1/1987 | Japan . |
| 63-087265 | 4/1988 | Japan . |
| 63-116880 | 5/1988 | Japan . |
| 63-287180 | 11/1988 | Japan . |

*Primary Examiner*—Huy Nguyen
*Attorney, Agent, or Firm*—Sidley & Austin

[57] ABSTRACT

A camera able to record and reproduce a photographed image includes a storage medium for storing a photographed image, and a reproduction device for reproducing the photographed image. The reproduction device has a reproducing head movable between a contraction position and a withdrawal position. Another camera has a first mode where photography is executed and a photographed image is recorded to a second mode where the recorded image is printed. Another camera has a printer device for printing a photographed image recorded on a recording medium on external reproduction paper, the printer device including an opening portion facing the external reproduction paper, and a presser member positionable above the opening portion for pressing the external reproduction paper.

41 Claims, 27 Drawing Sheets

FIG.8

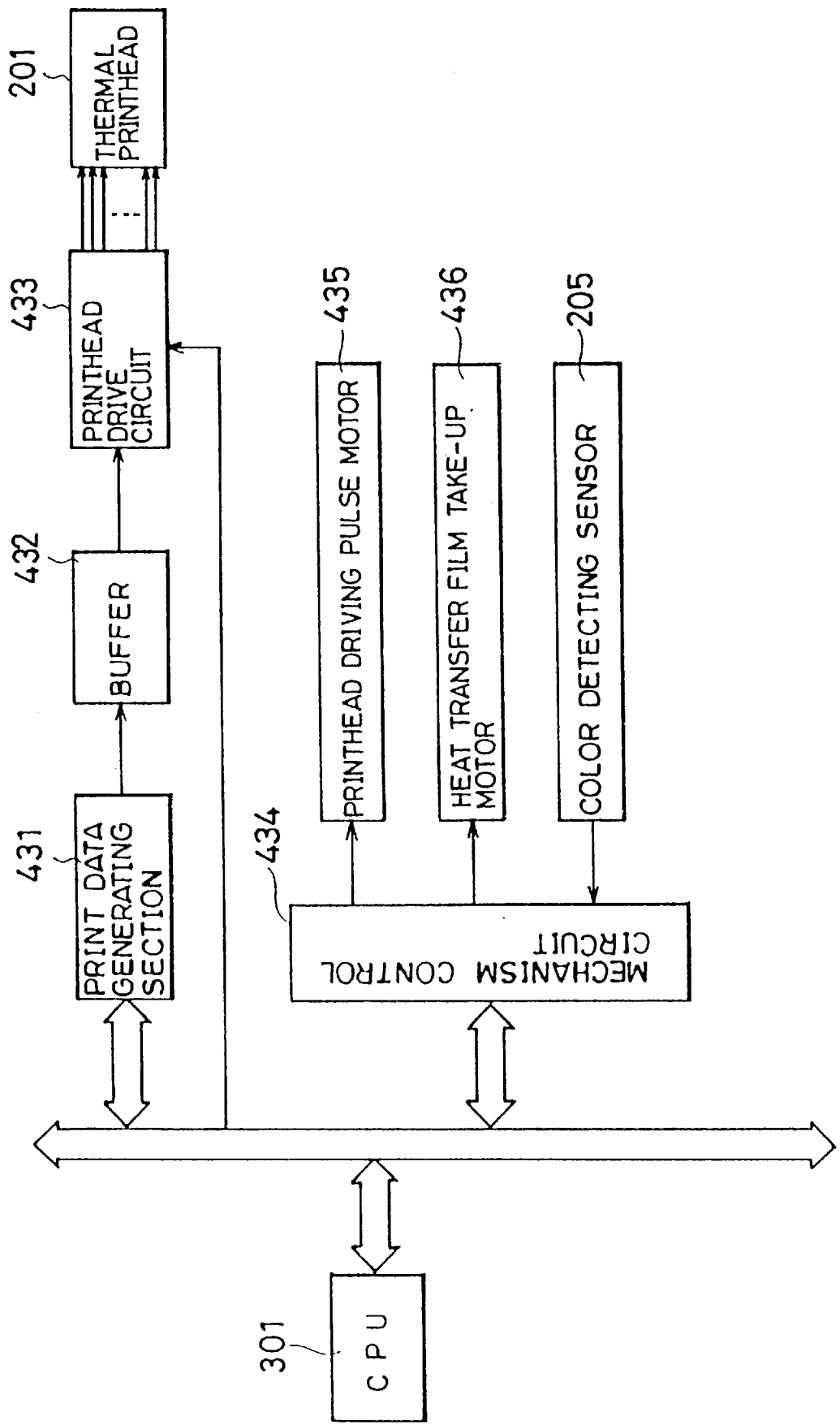

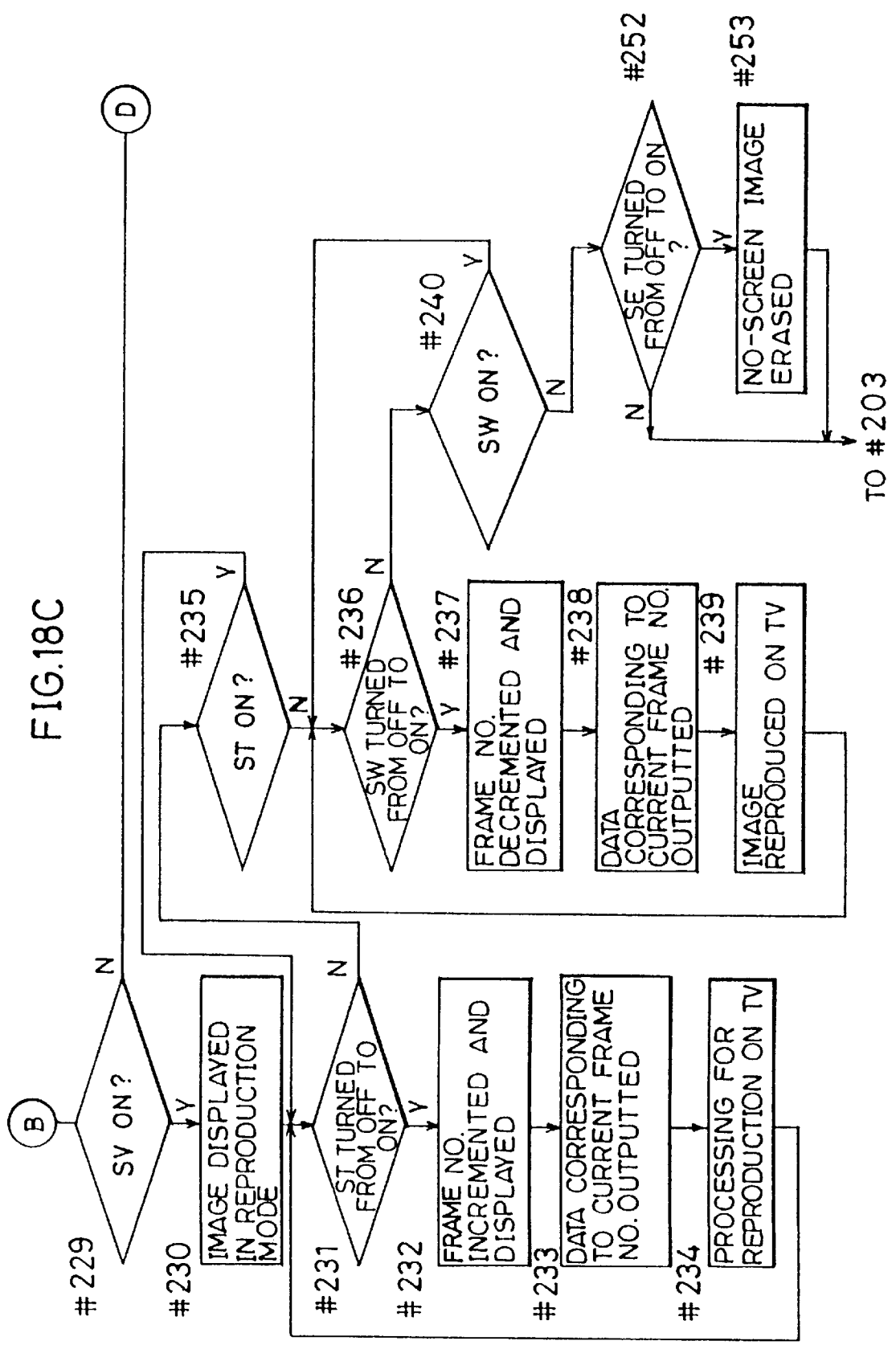

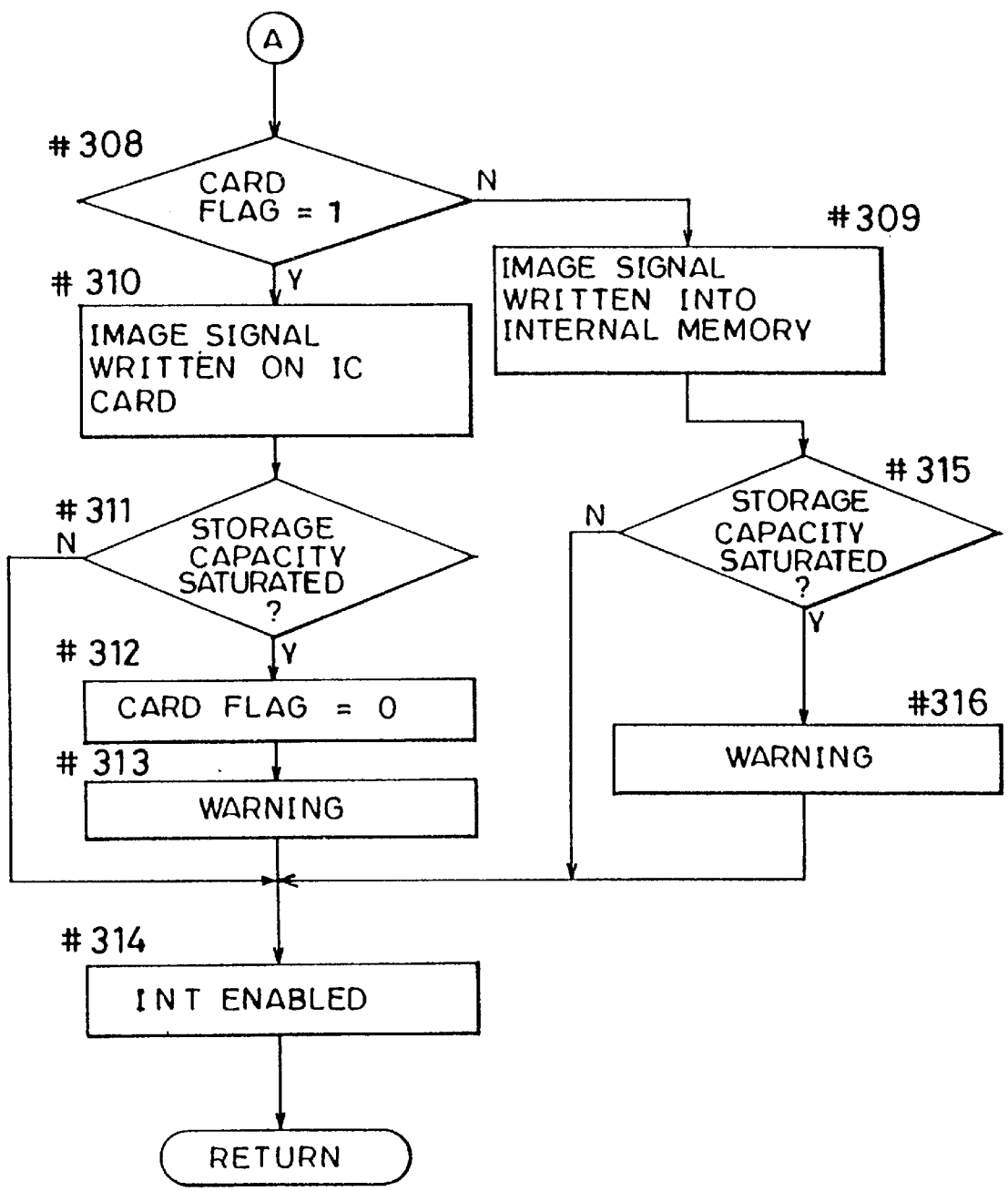

CAMERA CAPABLE OF RECORDING AND REPRODUCING A PHOTOGRAPHED IMAGE

This application is a continuation, of application Ser. No. 07/524,374, filed May 15, 1990 abandoned.

BACKGROUND OF THE INVENTION AND RELATED ART STATEMENT

The present invention relates to a camera which is able to reproduce photographed images according to needs.

In recent years, there have been commercially available electronic cameras which make it possible to record a photographed image once and reproduce it on a CRT screen or by a printer.

Japanese Unexamined Patent Publication No. 61-189785, as an example of this type of electronic camera, discloses a camera with built-in printer which records photographed images once and reproduces the recorded images on printing paper internally provided therein according to needs.

In the camera with a built-in printer, however, since it is necessary to provide printing paper as a recording medium inside the camera body, a printer mechanism such as a printhead, a thermal transfer film, a thermal transfer film feeder in addition to a recording device, the overall size of the camera becomes larger and the construction becomes complicated. This is contrary to recent users' needs of a compact camera assuring increased portability. Also, in the camera disclosed in Japanese Unexamined Patent Publication No. 61-189785, the camera cannot be changed or reduced in size when photographing. In other words, the printing section is not inserted in the camera body so as to reduce the size when photographing. Accordingly, poorer balance is involved in holding the camera when photographing.

There has been known an instant picture camera in which a photographed image is printed out immediately after photographing. However, since printing paper and a printer mechanism are provided in the camera body, the overall size is larger. Further, since a recording device is not provided, only a limited applicability can be available.

Japanese Unexamined Patent Publication No. 64-868 discloses an electronic camera including a semiconductor memory for recording a photographed image. Recorded images are reproduced by a separate printer. However, it will be seen in this electronic camera that photographed images cannot be reproduced without regard to time and place because the camera does not integrally carry a printer.

In such cameras executing a plurality of operations, furthermore, there have been proposed combination switch buttons in order to reduce the number of operation switch buttons. For example, a camera may include a switch button which serves for both photography and erasing a recorded image, a switch button which serves for both photographing and reproducing a photographed image on TV, and a switch button which serves for both photographing and reproducing a photographed image. However, for the photographing and image erasure combination switch button, an erasure operation is practiced by manually changing a mode change switch and then pressing both the combination switch button and another button at the same time. For the photographing and TV reproduction combination switch button, a reproduction operation is practiced by manually changing a mode change switch and then pressing the combination switch button halfway. For the photographing and reproducing combination switch button, photography and reproduction are practiced at the same time by pressing the combination switch button. Accordingly, in conventional combination switch buttons, it will be seen that the number of operation switches are not actually reduced, and operation of such switches is cumbersome. Also, there has not been disclosed a switch button which serves for both photographing button and printing button.

SUMMARY OF THE INVENTION

It is an object of the present invention to provide a camera capable of recording and reproducing a photographed image which has overcome the above-mentioned drawbacks.

According to the present invention, a camera capable of recording and reproducing a photographed image comprises storage means for storing a photographed image, and reproduction means for reproducing a photographed image, stored in the storage means, on external reproduction paper.

According to the present invention, also, a camera capable of recording and reproducing a photographed image comprises storage means for storing a plurality of photographed images, selection means for selecting one image from the plurality of photographed images stored on the storage means, and printer means for printing the selected image.

According to the present invention, further, a camera capable of recording and reproducing a photographed image comprises a main body, reproduction means carried by the main body, the reproduction means including a reproducing head, and being changeable from a first position where the reproducing head is placed in the main body when recording to a second position where the reproducing head is withdrawn from the main body when reproducing and vice versa, and changer means for changing the reproduction means from the first position to the second position and vice versa.

According to the present invention, furthermore, a camera capable of recording and reproducing a photographed image, being changeable from a first mode where photography is executed and a photographed image is recorded to a second mode where the recorded image is printed and vice versa, comprises changer means including an operable member for changing the camera from the first mode to the second mode and vice versa by the same operable member.

According to the present invention, moreover, a camera comprises printer means for printing a photographed image recorded on a recording medium on external reproduction paper, the printer means including, an opening portion facing the external reproduction paper and a presser member positionable above the opening portion for pressing the external reproduction paper.

These and other objects, features and advantages of the present invention will become more apparent upon a reading of the following detailed description and drawings.

BRIEF DESCRIPTION OF THE DRAWINGS

FIG. 8 is a memory map illustrating where the image data is stored in the internal memory;

FIG. 11 is a block diagram showing a configuration of the printer section;

DETAILED DESCRIPTION OF PREFERRED EMBODIMENTS OF THE INVENTION

FIGS. 1 through 11 show a first camera according to the present invention, having a built-in printer.

Figure 1:
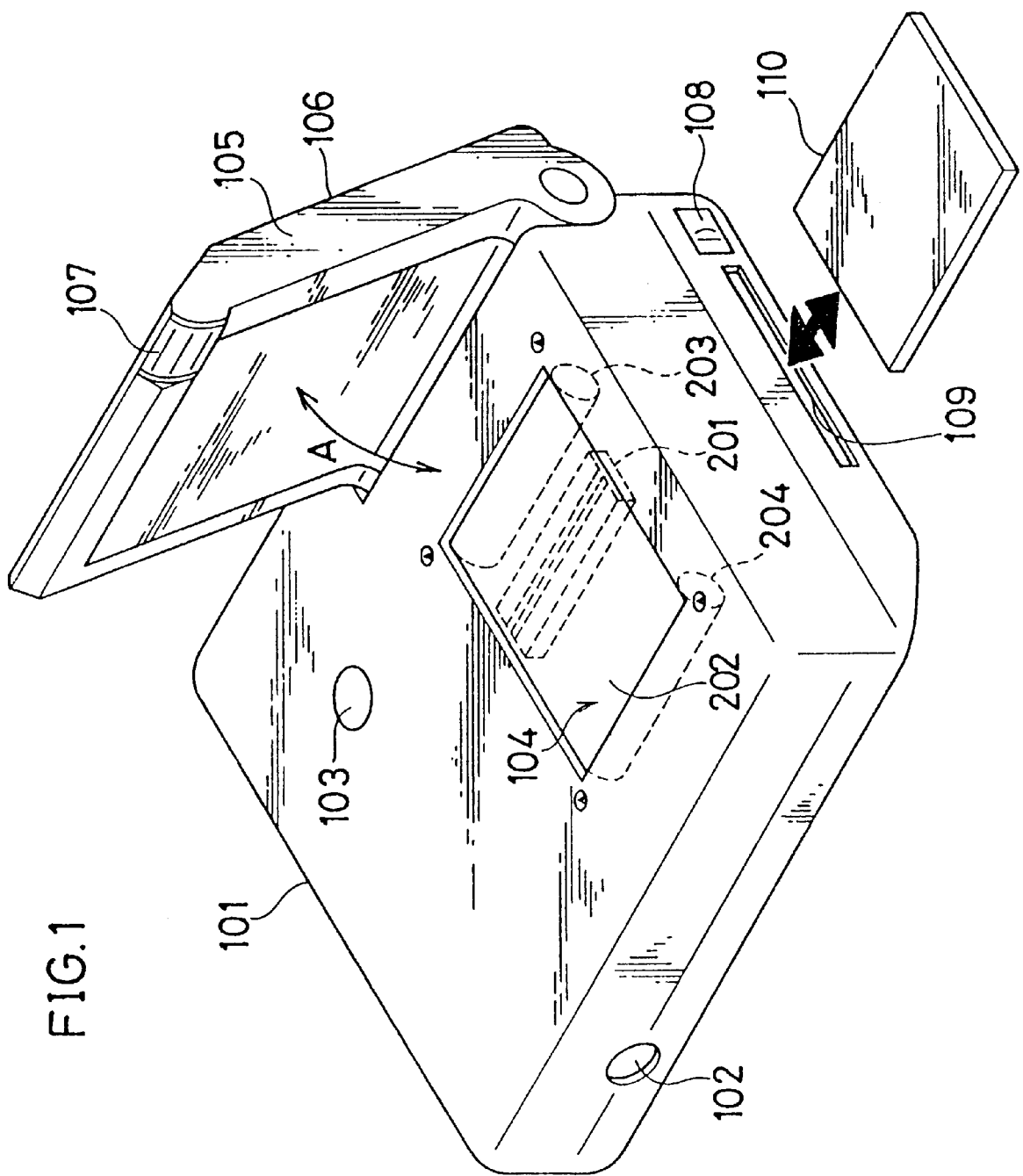
FIG. 1 is a perspective view illustrating a first camera capable of recording and reproducing a photographed image according to the present invention.

Referring to FIG. 1, a camera body 101 includes a photographing section, and an image data output section. The photographing section has an optical system, an image pick-up portion, and an image processing portion. The image data output section has a printer, an image display portion, and an auxiliary storage portion. The photographing section and the image data output section are disposed in a left side and a right side of the camera body 101, respectively. An aperture for a lens 102 with switchable focal length is provided in the front of the photographing section of the camera 101. At an appropriate position on the top of the photographing section of the camera 101 is provided a control button 103 for controlling a shutter release operation on one hand and a printout operation on the other hand.

At an approximate center on the top surface of the image output section is provided an opening 104 through which an image is printed out on external printing paper. Just under the opening 104 is disposed a printer section 200 (to be described later) which includes a thermal printhead 201, a thermal transfer ink film 202, and a supply roller 203 and a take-up roller 204 for the thermal transfer ink film 202. Further, a lid 105 swingable in the direction of an arrow A is attached to a rear portion of the image output section of the camera 101 which enables a photographer to open and close the opening 104. A flat panel display window 106 which functions as both a viewfinder and a monitor (see FIG. 2B) is mounted on an outer surface of the lid 105. A flash light aperture 107 of an electronic flash unit is provided at a front edge of the lid 105. When printing an image, the lid 105 is turned down onto the camera body 101 to hold the external printing paper tight against the opening 104. On the other hand, the lid 105 is swung up and used as an electronic flash when flash photography is required. The distance between the lens 102 and the flash light aperture 107 increases when using the electronic flash. With this arrangement, the photographer can avoid the red-eye phenomenon.

Provided on a side of the image output section of the camera body 101 are a slot 109, where a removable storage medium 110 is inserted, and an eject button 108 for ejecting it. The storage medium 110 (hereinafter called the IC card) is a sort of IC card including a SRAM and a built-in backup battery. A photographed image is stored on the IC card 110 whenever required, as described later.

Figure 2A:
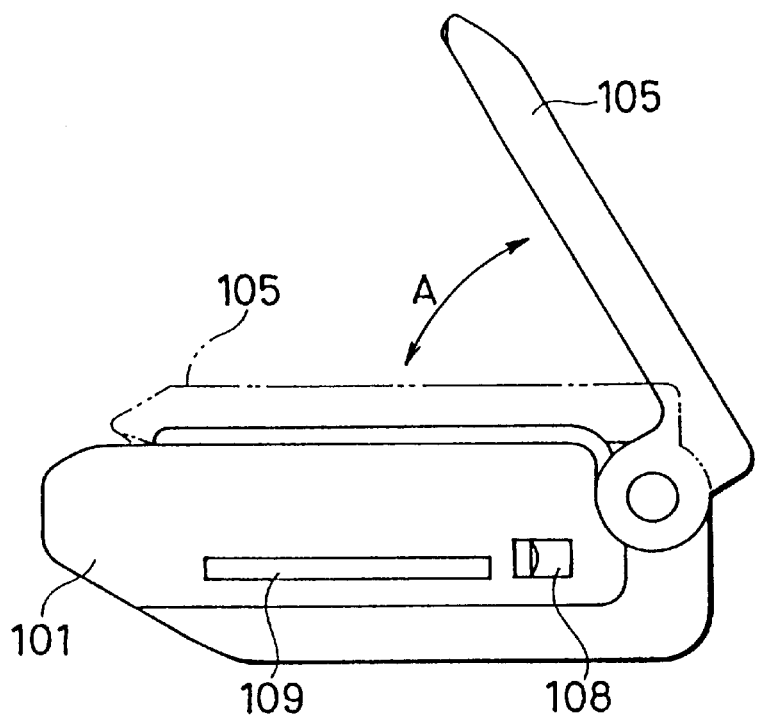
FIG. 2A is a side view of the first camera.
Figure 2B:
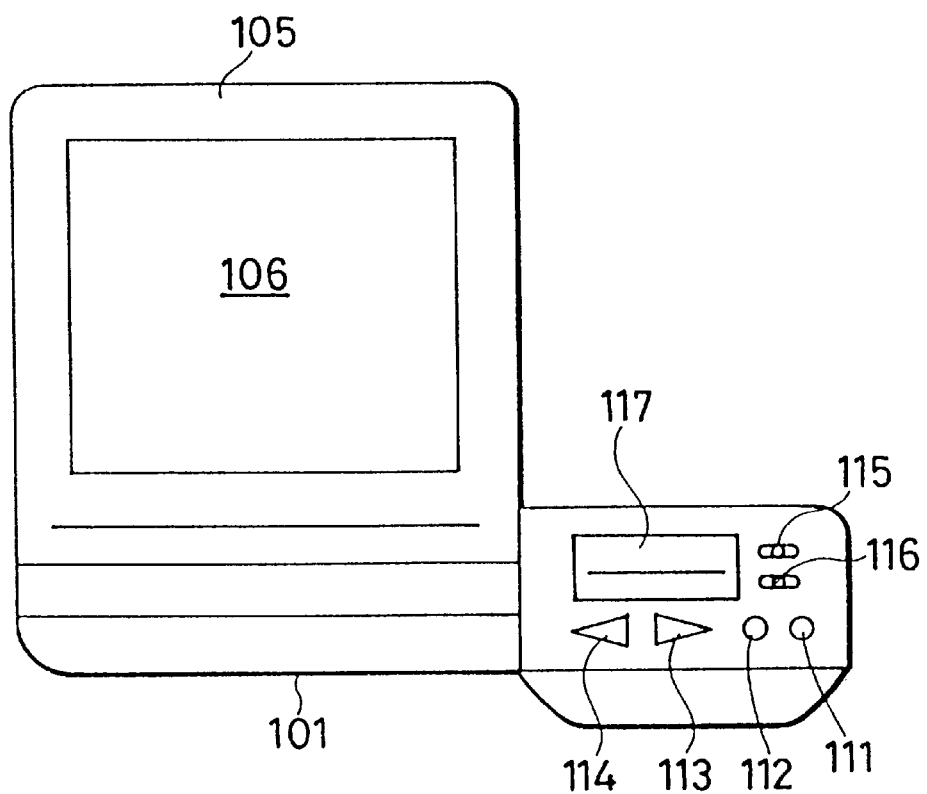
FIG. 2B is a rear view of the first camera.

FIG. 2A is a side view of the first camera with built-in printer and FIG. 2B is a rear view of the first camera with built-in printer.

Common part numbers are used in FIGS. 2A, 2B and FIG. 1 to identify the same parts. As already explained, the lid 105 can be swung in the direction of the arrow A and covers the opening 104 when fully turned toward the camera body 101, as shown by the two-dot chain line in FIG. 2A. With this arrangement, the lid 105 shields the opening 104 to protect the printer section 200 when storing the camera and squeezes the entire area of external printing paper when printing an image to prevent color misalignment. Specifically, color misalignment is prevented because of the fact that the external printing paper is held at a fixed position during the printing process in which the printhead is repeatedly moved for every color.

As shown in FIG. 2B, a start switch 111, a print mode selection switch 112 which activates the print mode, multi-function control switches 113 and 114, an erasure switch 115, a monitor mode selection switch 116 and an indicator 117 are arranged on a rear portion of the photographing section of the camera body 101. The start switch 111 is adopted for controlling startup of the camera. The print mode selection switch 112 is used to set the camera in a print mode before printing a photographed image on external printing paper and, once the print mode is selected, the afore-mentioned control button 103 functions as a print start button. The control switches 113 and 114 are multi-function switches. They are adapted to advance and reverse stored images when reproducing recorded images. Also, they are adapted to change the focal distance of the lens 102 from a telephoto position to a wide angle position, and vice versa, when photographing. The erasure switch 115 is adapted to erase an already recorded image, and the monitor mode selection switch 116 connects the camera to an external TV to monitor an image. When the monitor mode selection switch 116 is turned on, an image is monitored on the externally connected TV. When it is turned off, an image is monitored on the display window 106. The indicator 117, including a LCD, indicates the photography mode status and the frame number when photographing an image. On the other hand, the indicator 117 shows the print mode status, the frame number of the printed image and various status indications during a print process.

The display window 106, also including a LCD, functions as an electronic viewfinder which displays a subject image before photographing it in the photography mode. During the reproduction process, the display window 106 works as an image monitor on which a recorded image read out of the IC card 110 or an internal memory of the camera 101 is presented, as described later.

Figure 3:
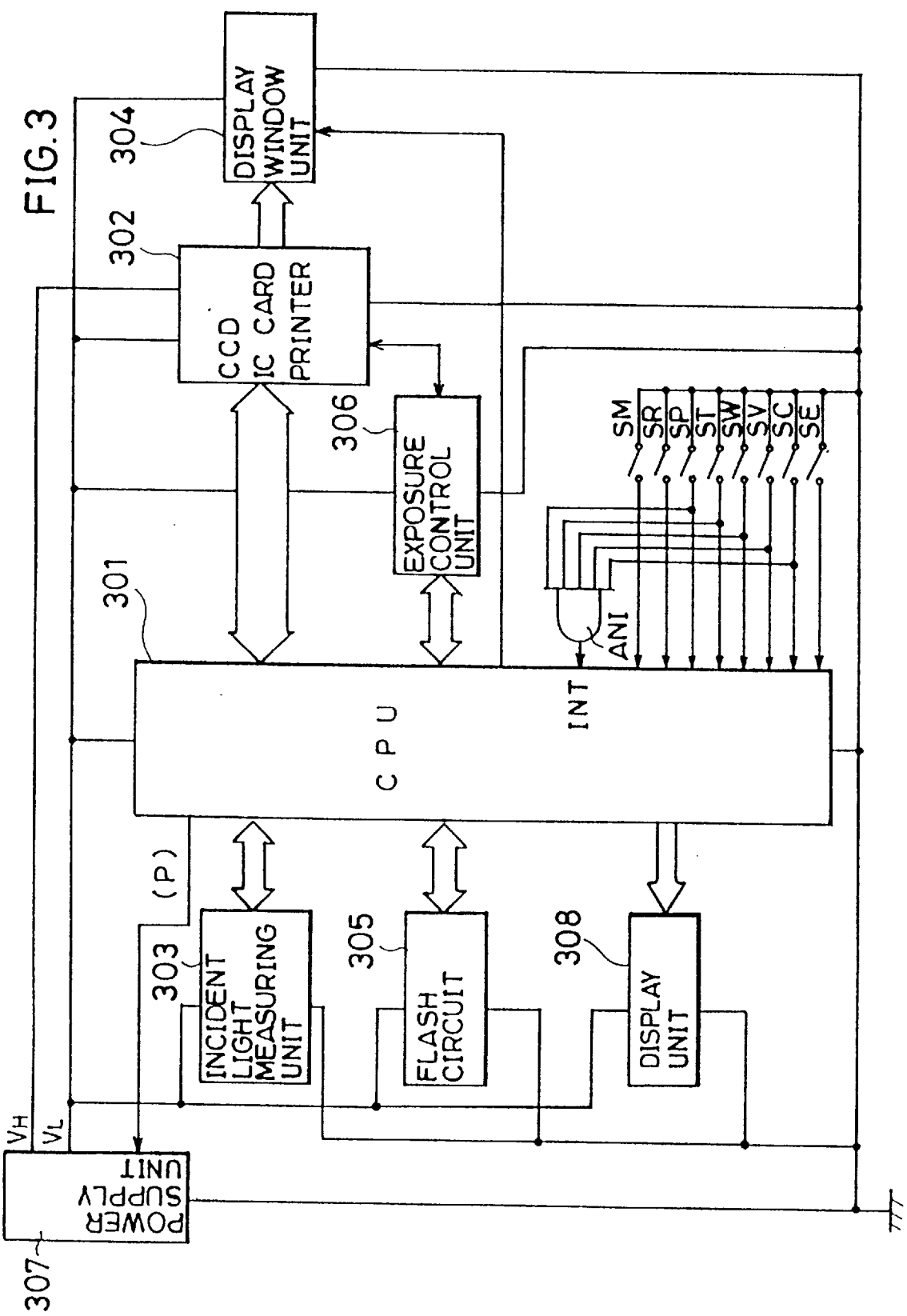
FIG. 3 is a system configuration diagram of the first camera.

FIG. 3 is a system configuration diagram of the first camera with built-in printer. Indicated at 301 in FIG. 3 is a system controller (hereinafter called the CPU) for controlling an overall operation of the camera including the aforementioned printer section 200. Indicated at 302 is a unit including a solid state image pick-up device (hereinafter called the CCD) for picking up a photographed image and a circuit for driving the CCD, processing an image signal, recording the image signal on the IC card 110, and printing the image. A detailed description of the unit 302 will be made later. Indicated at 303 is an incident light measuring unit for measuring luminance of a subject and outputting the light measurement data to the CPU 301. Indicated at 304 is a first display unit including the display window 106, described with respect to FIG. 2B, and a drive circuit for the display window 106. The unit 304 is adopted to reproduce a recorded image given from the unit 302 on the display window 106. Indicated at 305 is an electronic flash circuit including the flash light aperture 107 shown in FIG. 1, a capacitor for storing an electric charge and associated components. Upon receiving control signals from the CPU 301, the flash circuit 305 is adopted to charge the capacitor to allow the flash light aperture 107 to glow, and outputting a signal to the CPU 301 to notify that the capacitor has been fully charged. Indicated at 306 is an exposure control unit for controlling exposure of the camera based on exposure time Tv, aperture setting value Av and other calculation results received from the CPU 301 as well as the CCD drive timing signal derived from CCD-TG (see FIG. 4) to be described later. Indicated at 307 is a power supply unit for producing a high voltage VH of 20 V, for example, to drive the CCD and a low voltage VL of 5 V, for example, to drive other individual elements. The power supply unit 307 is adapted to supply the high voltage VH to the CCD in accordance with a signal (P) sent from the CPU 301. Indicated at 308 is a second display unit including the indicator 117, described with reference to FIG. 2B, and a drive circuit for the indicator 117.

Next, switches SM through SE are explained. SM is a main switch for starting the camera with built-in printer. The switch SM corresponds to the start switch 111 shown in FIG. 2B. SR is a start switch which functions as a photography start button when photographing a subject and a printout start button when printing an image. The switch SR corresponds to the control button 103 shown in FIG. 1. SP is a switch operable when the camera is set in a photography model for entering a the printing operation. The switch SP corresponds to the print mode selection switch 112 shown in FIG. 2B. ST is a switch for setting the object lens 102 at the telephoto lens position when photographing. In other than the photographing operation, for example, image printout or reproduction, the switch ST works as an access switch to advance images in the normal order so that images recorded on the IC card 110 or in internal memory of the camera 101 are reproduced sequentially on the display window 106. The switch ST corresponds to the control switch 113 shown in FIG. 2B. When the switch ST is used as a sequential frame advance switch, a succeeding frame of recorded image is reproduced each time it is turned on. SW is a switch for setting the object lens 102 at the wide-angle lens position when photographing. In other than the photographing operation, for example, image printout or reproduction, the switch SW works as an access switch to advance images in the reverse order so that images stored in on the IC card 110 or in internal memory of the camera 101 are reproduced sequentially on the display window 106. The switch SW corresponds to the control switch 114 shown in FIG. 2B. When the switch SW is used as a sequential frame reversing switch, a preceding frame of recorded image is reproduced each time it is turned on.

SV is a switch used when outputting an image recorded in the IC card 110 or internal memory of the camera 101 to a TV set (not illustrated) connected externally to the camera. The switch SV corresponds to monitor mode selection switch 116 shown in FIG. 2B. An operator can monitor not only the normal size of an image on the display window 106 but also an enlarged view of the photographed image on an associated TV screen by operating the switch SV. SC is a switch for detecting whether the IC card 110 is mounted in the slot 109 of the camera body. The switch SC is turned on when the IC card 110 is in the slot. SE, corresponding to the switch 115 shown in FIG. 2B, is an erasure switch for erasing an already-stored image. If the switch SE is turned on when a stored image is being printed or reproduced on a TV screen, the currently monitored image is erased from the IC card 110 or internal memory of the camera 101. Since the outputs of the switches SP, ST, SW, SV and SC are connected to the inputs of an AND circuit AN1, interrupt operations to be described later are carried out if any of these switches is turned on.

Figure 4:
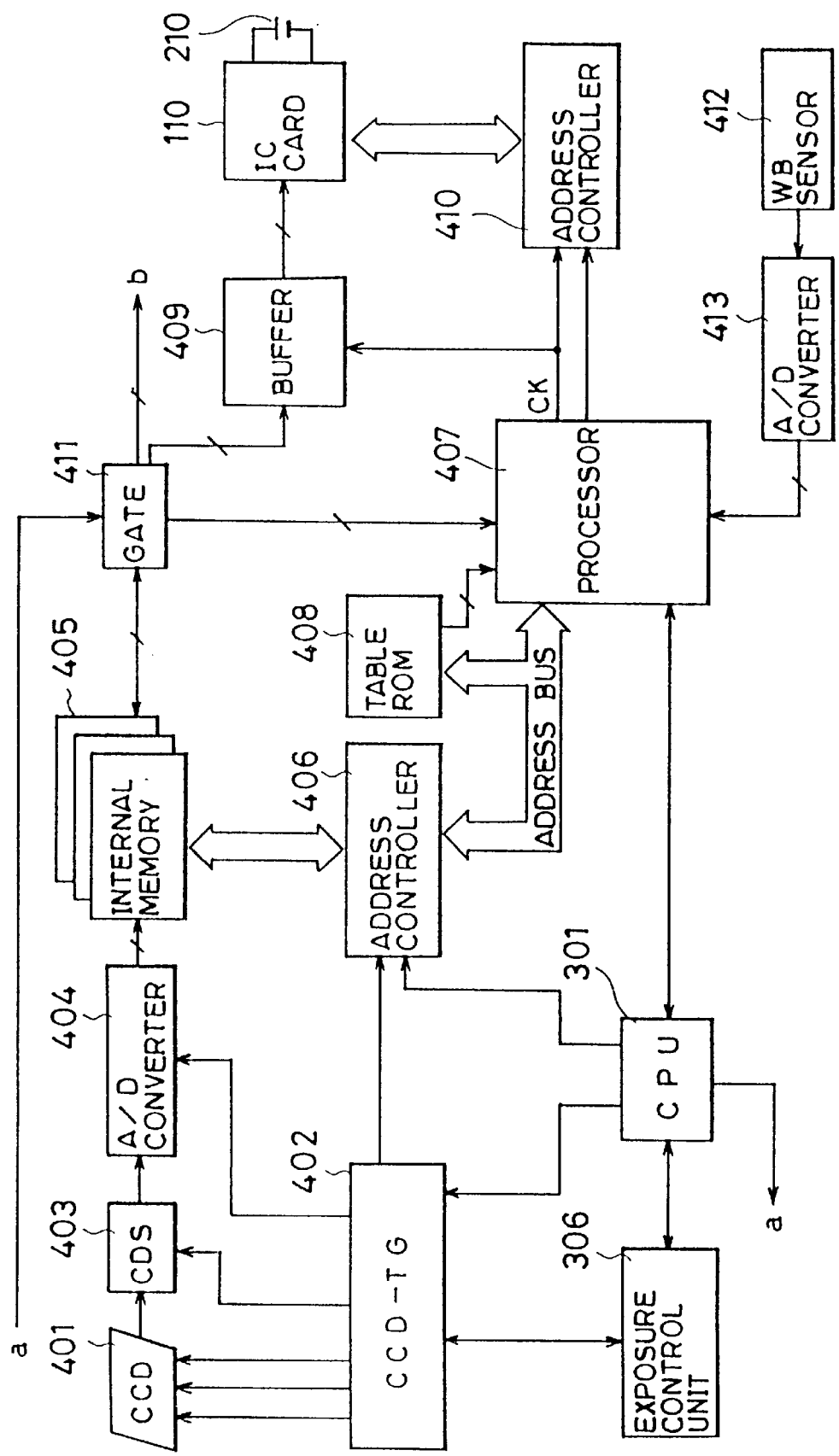
FIG. 4 is a block diagram showing an internal circuit structure of a unit 302 shown in FIG. 3, including a CCD and an IC card.
Figure 5:
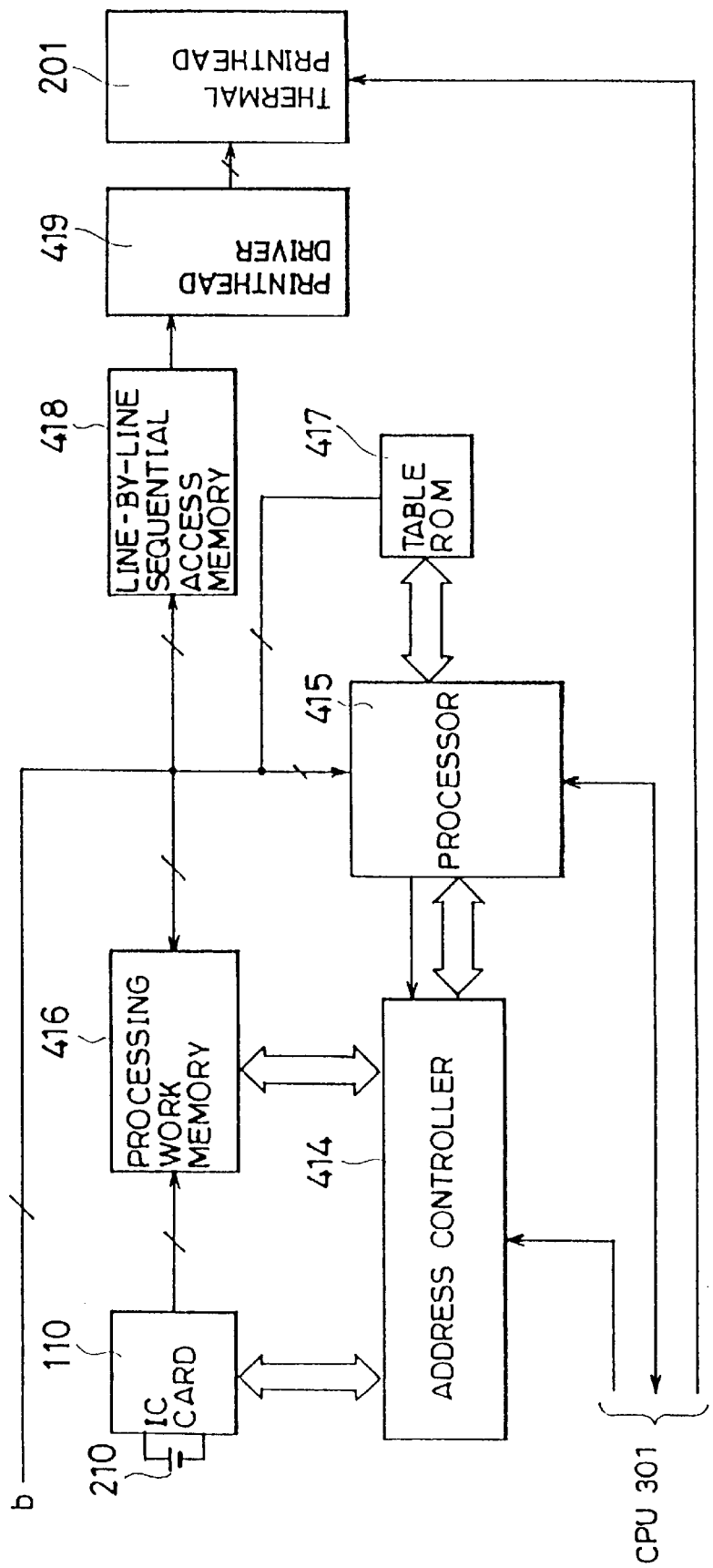
FIG. 5 is a block diagram of a printer section.
Figure 6:
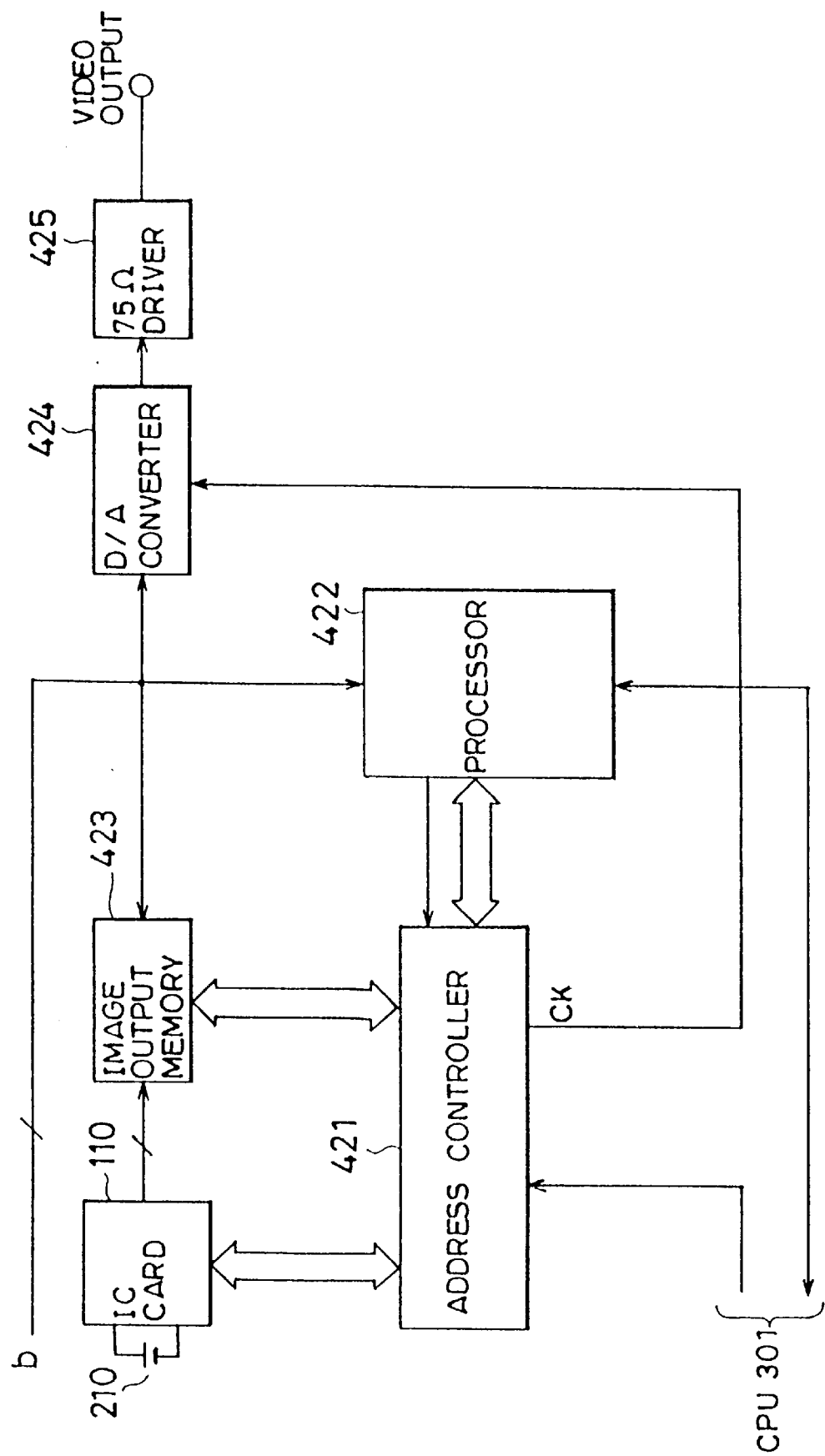
FIG. 6 is a block diagram of a circuit which reproduces recorded images on a TV screen.

Next, FIG. 4 is a block diagram illustrating the internal circuit structure of the unit 302 shown in FIG. 3, including the CCD 401 and IC card 110. FIG. 5 is a block diagram of the printer section. FIG. 6 is a block diagram of the circuit for reproducing a stored image on the TV screen.

As already explained, CCD 401 is a solid state image pick-up device provided with RGB stripe filters and having electronic shutter function. CCD-TG 402 delivers control signals and clock signals to individual circuits of the unit. More specifically, CCD-TG 402 generates a shutter control signal for CCD 401, a clock signal for driving an image signal readout circuit, a clock signal for CDS 403, a clock signal for an A/D converter 404 and a clock signal for an address controller 406. CDS 403 samples the output image signal of CCD 401 to perform double correlation. The A/D converter 404 converts the output image signal of CCD 401 from analog to digital data. Although an 8-bit A/D converter 404 is employed in this preferred embodiment of the invention, a desired number of bits can be selected depending on the required image quality. An internal memory 405 is an SRAM, for example, featuring a short access time. It reads serial data from CCD 401 and stores image data. The internal memory 405 is provided with a working memory area to perform image data processing in addition to an image memory area having a capacity to store at least one frame of photographed image. The internal memory 405 also stores image data obtained through a data compression process performed by the processor 407 for image processing.

Figure 7:
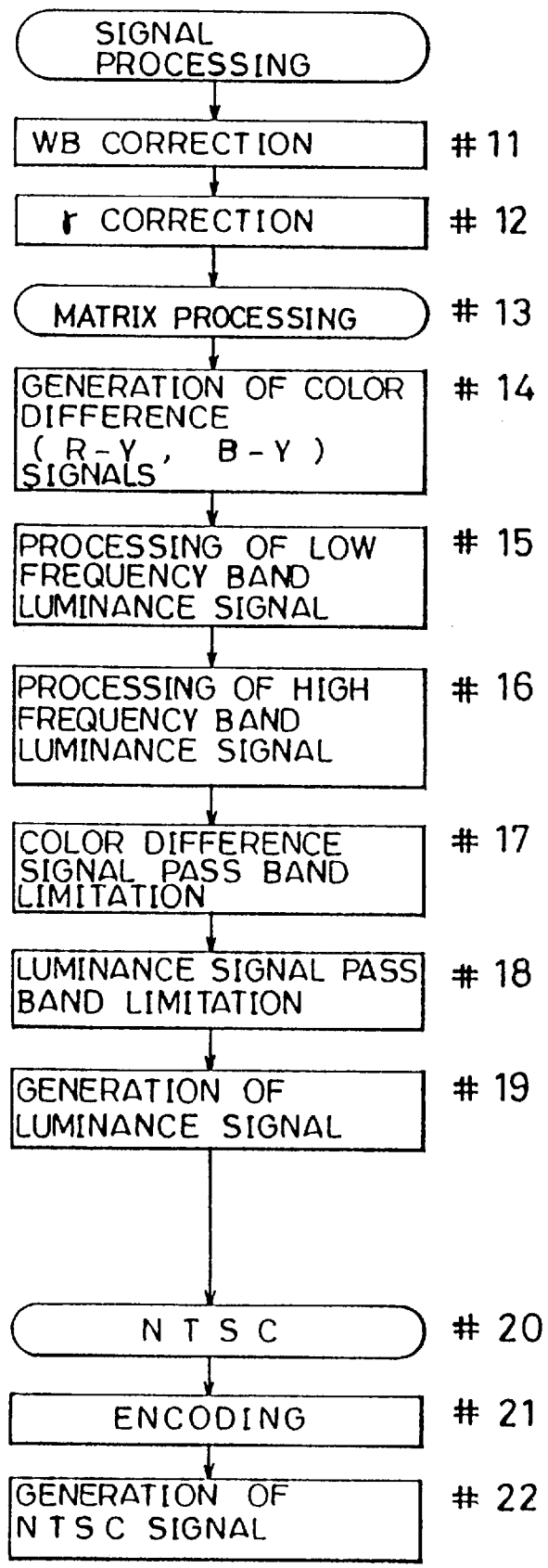
FIG. 7 is a flowchart showing data processing operation executed after the image data derived from the CCD is A/D converted and written into an internal memory.
Figure 8:
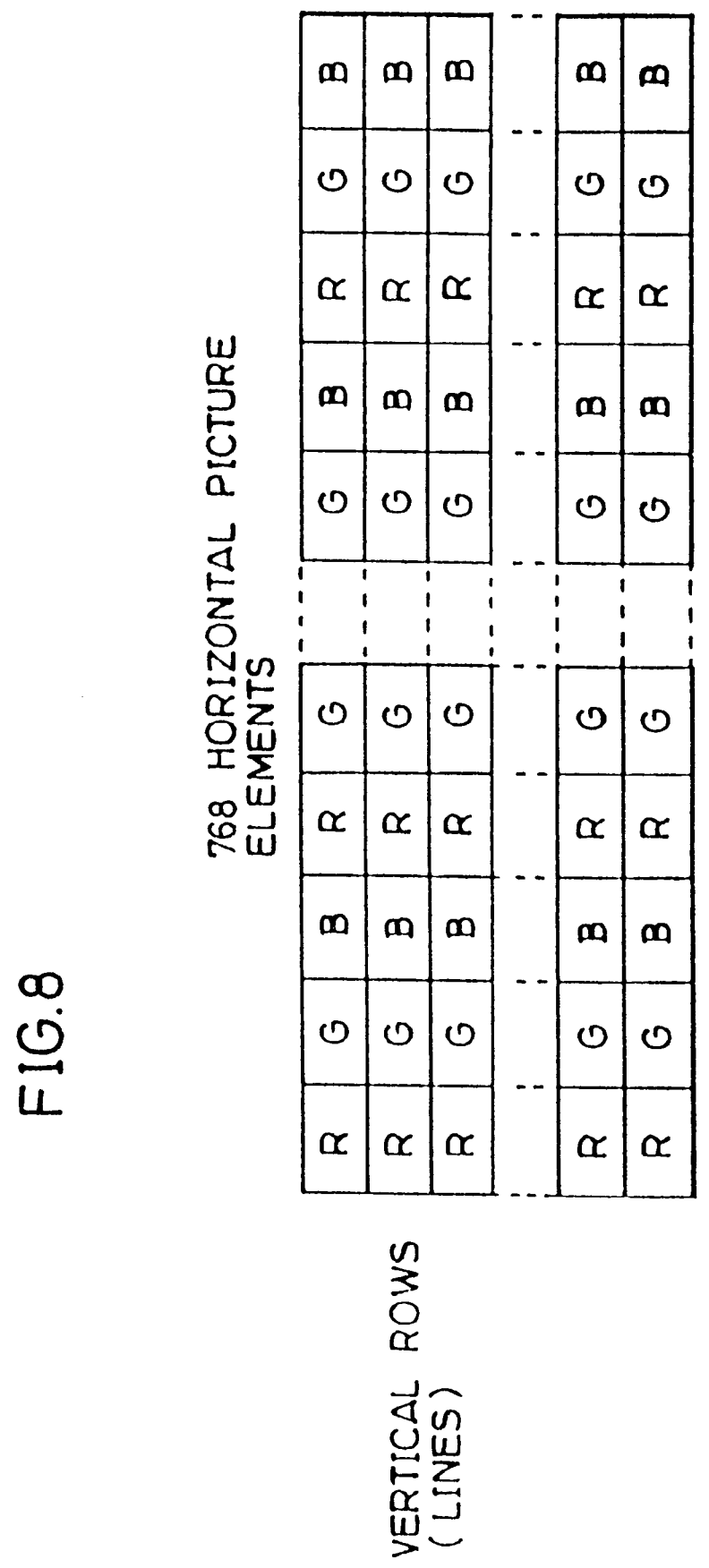

The address controller 406 functions as follows. When reading image data from CCD 401, the address controller 406 outputs a serial write address signal for the internal memory 405 upon receiving a clock signal from CCD-TG 402 and then, outputs an address signal to the internal memory 405 after decoding an I/O output and address signal output from the processor 407. Further, the address controller 406 reads a serial clock signal at a low speed to write the processed image data to an external storage medium such as the IC card 110. Table ROM 408 is a memory device in which a factor to be used when applying white balance (hereinafter called WB) correction, i.e., WB correction factor, and a factor to be used when applying color conversion for the printer and TV, i.e., correction factor, are written in advance. These two kinds of correction will be discussed later. The processor 407 applies various kinds of digital signal processing as shown in FIG. 7, to the image data. Image data are stored in the internal memory 405 according to a format illustrated in FIG. 8, and then, is rewritten to the same addresses after the R, G and B components of the image data are passed through the WB correction, correction, and compression processes.

WB correction refers to a process in which color temperature information received from a WB sensor 412 is converted by a conversion factor prewritten in the table ROM 408, whereas correction refers to a process in which the color-converted data is further converted by a conversion factor prewritten in the table ROM 408. The data compression process goes as follows. Raw image data are first compressed to ⅔ after being separated into the luminance, or Y, signal and a color difference, or C (U, V), signal. Next, the resultant signals are compressed to ½ after calculating differences of the Y, U and V values from their respective preceding values. After all, the whole data compression process is considered as a DYUV compression of the Compact Disc Interactive Media (hereinafter called the CD-I) system to compress the image data to ⅓. The CD-I system can allow flexible, mutual access to various kinds of digital information including not only computer data but also audio signal and still image data.

A buffer 409 is provided between the internal memory 405 and IC card 110 to temporarily store the image data output from the internal memory 405. Address controller 410 generates read and write address signals for allowing the contents of the buffer 409 to be output and written to the IC card 110.

Controlled by the CPU 301, a gate 411 performs switching of connections between the internal memory 405, IC card 110, and the processor 407, or connects the internal memory 405 to the IC card 110. Indicated at 413 is an A/D converter for converting the analog signal derived from the WB sensor 412 into a digital signal. Indicated at 210 is a built-in battery of the IC card 110.

Now, operation of each unit is explained below in further detail. When the start switch SR is turned on in the photography mode, the CPU 301 outputs a start signal to CCD-TG 402 while causing the light measuring unit 303 to perform incident light measurement. The exposure control unit 306 controls exposure of the camera according to the aperture setting value Av obtained from the result of light measurement. Then, it introduces light upon CCD 401 by outputting a shutter control signal to CCD-TG 402 depending on the exposure time data Tv.

Upon completion of the above exposure process, the CPU 301 switches the address controller 406 so as to output a serial signal. The CPU 301 also outputs a read enable signal to CCD-TG 402. Consequently, the image data read into CCD 401 is transferred to the internal memory 405. When data transfer has been finished, the CPU 301 switches the address controller 406 to the processor side 407 to perform communications. The CPU 301 then outputs command signals for causing signal processing such as WB correction, correction as well as data compression for the image data as described in detail later with reference to FIG. 7. After these signal processing steps, the image data are stored again in the internal memory 405.

In case the IC card 110 is set ready to store the image data, the CPU 301 connects the internal memory 405 to the IC card 110 by switching the gate 411. Also, the CPU 301 causes both address controllers 406 and 410 to output address signals. As a result, the image data in the internal memory 405 are transferred to the IC card 110 via the buffer 409.

Now, the unit diagram of the printer section 200 is described below referring to FIG. 5.

An address controller 414 transfers the compressed image data obtained through individual steps of signal processing from the IC card 110 to a specified area of a processing work memory 416 according to a command received from a processor 415. What is meant by the "specified area" is that the data are sequentially stored in the memory one line after another. On the other hand, the address controller 414 decodes an address signal coming from the processor 415 and delivers the resultant address signal to the work memory 416 in each step of signal processing described later. The work memory 416 is a SRAM, for example, featuring a short access time. The work memory 416 is adopted for reading the compressed data from the IC card 110, to temporarily store the data and to store the results of signal processing. Table ROM 417 stores a correction factor for converting TV image data into print image data and predefined bit map data to be used for area quantization, which is explained later, to apply density correction to printout picture elements. The processor 415 demodulates or expands the compressed data recorded on the IC card 110 and converts it into a format to suit the printer. It also performs the afore-mentioned correction and area quantization by using the data read from the table ROM 417. More specifically, the compressed data are expanded to generate the luminance signal (Y) and the color difference signal (C) to be described later. From these signals, the processor 415 produces complementary color signals that will match the respective ink colors of the printer. Then, it performs correction suitable for the type of printer in use based on the complementary color signals. Further, each color of each picture element is area-quantized by use of the bit map data stored in the table ROM 417. The resultant data are written in a line sequential access memory 418 to generate print data with a 4-dot line width. Each time the above signal processing is completed for one line of print data, the processor 415 transmits a process end signal to the CPU 301. The compressed data expansion process as used in the afore-mentioned CD-I system reproduces the original data by first calculating true color differences based on the data stored on the IC card 110 and then, adding the color difference data to the immediately preceding values. When the compressed data expansion process is adapted to the ADCT system, which is described later, the original data are reproduced from the data recorded on the IC card 110 by a reversal of the conversion carried out in the compression process. correction refers to a process in which image data produced for presentation on a TV screen are converted into a different form of image data suitable for the printer. Also, area quantization refers to a process in which color density of each picture element is converted into the number of dots to be printed within a 16-dot area composed of 4 dots by 4 dots. The resultant dot number data are sequentially transferred to the line sequential access memory 418. In this process, each 4×4 dot matrix segment is treated as a unit (or a picture element).

The line sequential access memory 418 stores one line of 4×4 dot data of individual picture elements and outputs one line of data (number of horizontal picture elements×4) at a time to a printhead driver 419. The printhead driver 419, including a buffer 432 and a printhead drive circuit 433 as described later (see FIG. 11), temporarily stores the above-mentioned image data in the buffer 432, converting such data into image data suitable for the printer, and outputting the resultant data to the thermal printhead 201. When heated in accordance with the image data received from the printhead driver 419, the printhead 420 transfers ink on external printing paper.

Now, operation of each unit is described below.

Print operation is started when the CPU 301 detects a print start command in the print mode. When printing an image stored on the IC card 110, the address controller 414 transfers the compressed data for the print image from the IC card 110 to a specified area of the work memory 416. On the other hand, when an image stored in the internal memory 405 is printed directly, a frame of print image (or page) in the internal memory 405 is selected by the address controller 406 and transferred into the work memory 416 via the gate 411 and processor 416. Next, the CPU 301 sends a command signal to the processor 415 requesting it to carry out signal processing for printing.

When receiving the command signal from the CPU 301, the processor 415 reads the image data from the work memory 416. The processor 415 then applies the aforementioned signal processing to individual ink colors in the order of Cy (cyan), Ye (yellow), Mg (magenta) and Bk (black). Upon detecting the end of processing of one line of image data, the CPU 301 executes printout of that one line by controlling the line sequential access memory 418 and thermal printhead 201. Each time a printout of one line is completed, the CPU 301 carries the thermal printhead 201 one line forward to prepare for printout of the succeeding line. Printout of one frame of a single color image is accomplished in this manner. After printout of the Cy (cyan) image is completed, the Ye (yellow), Mg (magenta) and Bk (black) images are printed in this order by repeating the similar printing process. Printout of one complete image is finished in this manner.

As an alternative to the above process, the thermal printhead 201 may be advanced one line forward after printing each line with all four colors. In this alternative printing manner, one frame of image is completed by a single longitudinal scanning.

FIG. 6 is a unit diagram of a circuit for reproducing an image on a TV screen. An address controller 421 transfers the compressed image data from the IC card 110 to a specified area of an image output memory 423 according to a command received from a processor 422. What is meant by the "specified area" is that the data are sequentially stored in the memory one line after another, for instance. On one hand, the address controller 421 decodes an address signal coming from the processor 422 and outputs the resultant address signal to the image output memory 423 when executing signal processing. On the other hand, the address controller 421 generates a serial read address signal and a clock signal for a D/A converter 424 while a composite video signal is being output from the image output memory 423. The image output memory 423 is an SRAM, for example, which features a short access time. The image output memory 423 is adapted to read the compressed image data from the IC card 110, to temporarily store the processed data in the course of signal processing, and to store the resultant NTSC video signal. The processor 422 performs expansion of the compressed image data and generates an NTSC composite signal by encoding the luminance signal (Y) and the color difference signal (C) through the expansion process, which is accomplished in a similar way to the afore-mentioned process. In the above encoding process, the color difference signal (C) is modulated by a subcarrier and added to the luminance signal (Y). D/A converter 424 decodes the above-mentioned NTSC composite signal to obtain an analog TV signal. 75 Ω driver 425 is an impedance matching circuit by which a video output is matched with the TV input.

The following circuit description delineates the operations carried out when outputting the video signal to the TV, referring to a above unit diagrams.

When the TV reproduction mode is selected, the CPU 301 detects a change of mode and starts reproduction of image on a TV screen. When reproducing an image stored on a IC card 110 via the TV output terminal (not illustrated), the compressed image data to be output to the TV are transferred to a specified area of the image output memory 423 by the address controller 421. On the other hand, when reproducing an image stored in the internal memory 405 on the TV screen, a frame of image (or page) to be reproduced is selected from the internal memory 405 by the address controllers 406 and 421, and read into the image output memory 423 via the gate 411 and processor 422. Subsequently, the CPU 301 enables the processor 422 and address controller 421 to communicate with each other and sends a command signal to the processor 422 requesting it to perform necessary signal processing for reproduction of image on the TV screen.

Upon receiving the command signal from the CPU 301, the processor 422 reads the image data one line after another out of the image output memory 423. The processor 422 then applies the signal processing described later to the image data and writes the resultant digital NTSC signal in the image output memory 423 again. At this time, horizontal and vertical synchronizing signals are added to the image data. In case the original image consists of a field picture of half the normal horizontal line density, a pseudo-frame image processing is applied to the image data when it is written in the image output memory 423, so that it looks as if one complete frame of image is recorded in the image output memory 423. The processor 422 outputs a process end signal at the end of processing of each individual frame image. After detecting the process end signal, the CPU 301 switches the address controller 421 to the NTSC output mode. Thereupon, the image output memory 423 is set to output an NTSC composite signal and the D/A converter 424 is activated to output an analog TV signal.

Photographing, printing and output to the TV are executed in the respective modes described above.

FIG. 7 is a flowchart showing how the image signal derived from CCD 401 is A/D-converted and how the resultant data is processed after it is written in the internal memory 405.

First, WB correction is applied to the R and B signals in step #11 to bring them to the same level with the G signal. In this process, individual color signals are adjusted to the same level by using a color temperature factor determined by color temperature information derived from the afore-mentioned WB sensor 412 and A/D converter 413 when photographing a reference white image obtained by projecting light of a set color temperature. This WB correction process is executed sequentially in a horizontal direction in units of three picture elements (R, G, and B) 256 (768/3) times or one line at a time.

Next, in step #12, correction is made to the G signal, and the R and B signals to which WB correction has already been applied. This correction is also executed sequentially in a horizontal direction in units of three picture elements (R, G, and B) one line at a time.

After the above-mentioned WB and corrections, matrix processing is applied to the signals in step #13 by using the functions shown below, for example, to generate the low frequency band luminance signal (Y) and color difference signals (R-Y and B-Y) (#14):

$$Y = 0.30R + 0.59G + 0.11B$$
$$R - Y = 0.70R - 0.59G - 0.11B$$
$$B - Y = 0.89B - 0.59G - 0.30R$$

Subsequently, the low frequency band luminance signal (Y) is processed in step #15. Then, in step #16, the R, G and B signals are individually multiplied by appropriate coefficients to reduce aliasing errors, and the levels of R, G and B that make up the dot sequential signal in the high frequency band are adjusted. As in the afore-mentioned signal processing, the low frequency band (#15) and high frequency band (#16) luminance signals are also processed sequentially in a horizontal direction in units of three picture elements (R, G, and B) one line at a time.

When the above processes have been completed, pass bands of the color difference signal and luminance signal are limited as necessary in steps #17 and #18 in a sequential (or horizontal) direction one line at a time. Further, the low frequency band and high frequency band luminance signals obtained in steps #15 and #16 are added in the frequency domain to generate a combined luminance signal (#19). This process of luminance signal generation is executed in a sequential (or horizontal) direction 256 times or one line at a time.

Before the image can be reproduced on a TV screen on completion of the foregoing processes, a burst signal, and horizontal and vertical synchronizing signals are added to the image signal to convert it to a standard television signal like the NTSC signal in steps #20 through #22.

Figure 9A:
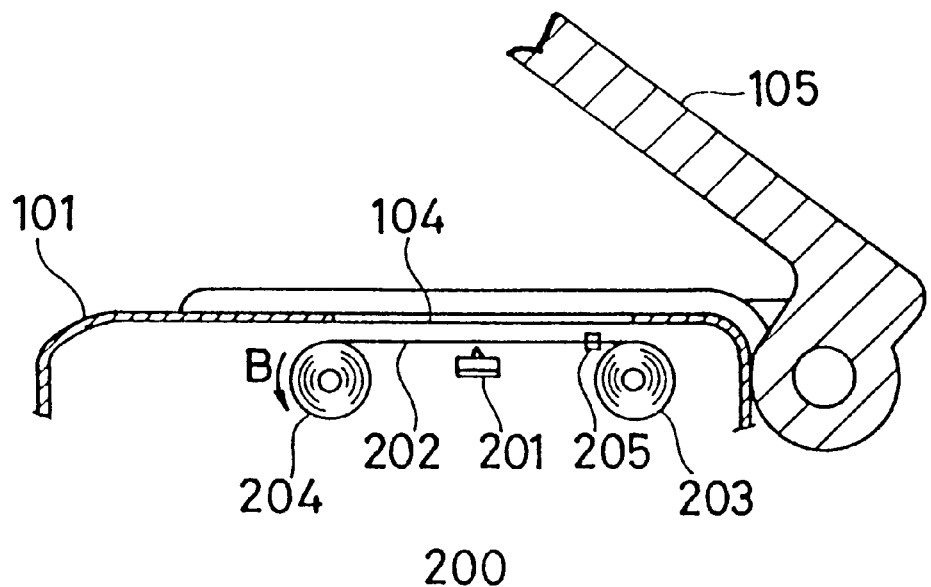
FIG. 9A is a perspective view showing a construction of the printer section.
Figure 9B:
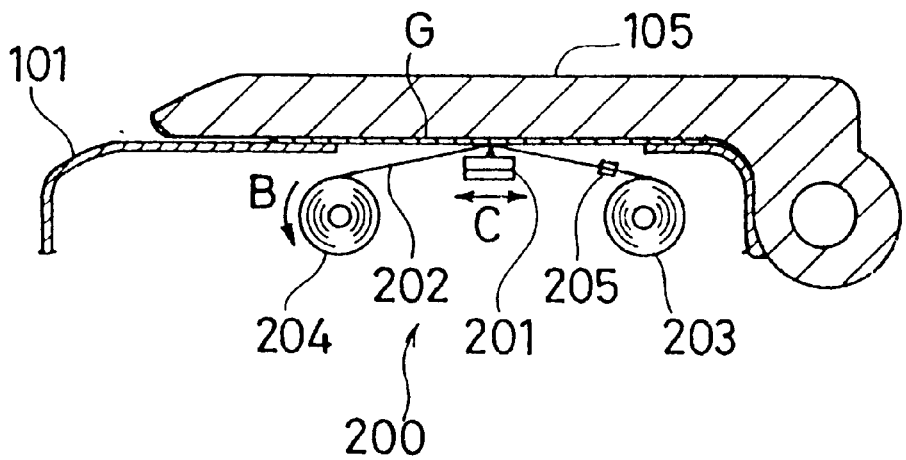
FIG. 9B is a cross sectional view of the principal parts of the printer section depicting how it prints on external paper.
Figure 10:
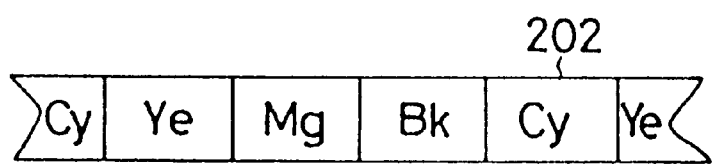
FIG. 10 is a diagram showing a configuration of a thermal transfer ink film.

FIGS. 9A and 9B illustrate cross sections of principal parts of the printer section 200 to show the printing an image on external paper. FIG. 10 illustrates a configuration of a thermal transfer ink film 202.

As shown in FIG. 9A, the printer section 200 is located just under the opening 104 of the camera body 101. As shown in FIG. 9B, the printer section 200 is arranged in such a manner that the thermal transfer ink film 202 is supplied in the direction of an arrow B from a supply roller 203 to a take-up roller 204, and a color detecting sensor 205 can detect the current print color. The thermal printhead 201 prints an image by writing the right color in the right position by heat transfer process through the thermal transfer ink film 202 as it scans across external paper G placed upon the opening 104 in the direction of an arrow C according to the image data. This scanning process is performed for each of the afore-mentioned four colors. A complete printout of a photographed image is obtained by repeating the scanning process four times to superimpose four discrete color images.

As shown in FIG. 10, cyan, yellow, magenta and black ink areas, for example, are arranged in order on the surface of the thermal transfer ink film 202 at regular intervals of which the film width is equivalent to or greater than that of the print area. With this arrangement, individual color images are printed with the respective color signals output from the line sequential access memory 418 to the thermal printhead 201.

When printing an image, the operator turns the lid 105 toward the camera body 101, as shown in FIG. 9B, and presses the control button 103 while holding down the external printing paper G placed upon the opening 104.

When the control button 103, or switch SR, is turned on, the printer section 200 starts the above-mentioned printing sequence and an image is printed out on the external printing paper G. Squeezed evenly by the lid 105 over the entire area, the external printing paper G will not be displaced by the printing action of the printer section 200, enabling printout free from color misalignment problems. Further, since the thermal printhead 201 is pressed against the external printing paper at an appropriate steady pressure by the above-mentioned lid 105, colors are heat-transferred at a constant density resulting in beautiful outputs.

FIG. 11 is a block diagram showing the configuration and operation of the printer section.

Overall operation of this section is controlled by the CPU 301. Indicated at 431 is a print data generating section including the afore-mentioned processor 415 and line sequential access memory 418. As already described, a buffer 432 converts parallel data of the bit number of one line supplied from the line sequential access memory 418 into serial data and outputs it to the printhead drive circuit 433. Using the output of the buffer 432, the printhead drive circuit 433 heats and drives the thermal printhead 201.

A mechanism control circuit 434 controls individual mechanical elements of the printer section 200, shown in FIG. 9A, based on the commands from the CPU 301 and is connected to a printhead driving pulse motor 435 which drives the thermal printhead 201 in its scanning direction, a thermal transfer film take-up motor 436 which drives the take-up roller 204 of the thermal transfer film 202, and the color detecting sensor 205.

Operation of individual circuits is described below referring to the above unit diagram description.

Upon detecting that the camera is set to the print mode, the CPU 301 transmits a print command signal to the printhead drive circuit 433. In accordance with the print command signal from the CPU 301, the printhead drive circuit 433 produces a heating signal to be applied to the thermal printhead 201 by using one line of dot data received from the buffer 432 so that a cyan image of the first line is printed. Then the thermal printhead 201 is carried one line forward by the printhead driving pulse motor 435. Printout of a complete image of the first color, or cyan, is accomplished by alternately printing a line of cyan and advancing the thermal printhead 201. Thereupon, the CPU 301 activates the printhead driving pulse motor 435 to bring the thermal printhead 201 back to the reference position, or the first line, and causes the thermal transfer film take-up motor 436 to take up the thermal transfer ink film 202 by the length of one color area to set to yellow. Printout of a complete yellow image is accomplished by alternately printing a line of yellow and advancing the thermal printhead 201 in the same way as above. A similar process is performed for magenta and black to reproduce a complete image by combination of colors. As already-mentioned, it is also possible to sequentially print cyan, yellow, magenta and black one line after another.

Figure 12A:
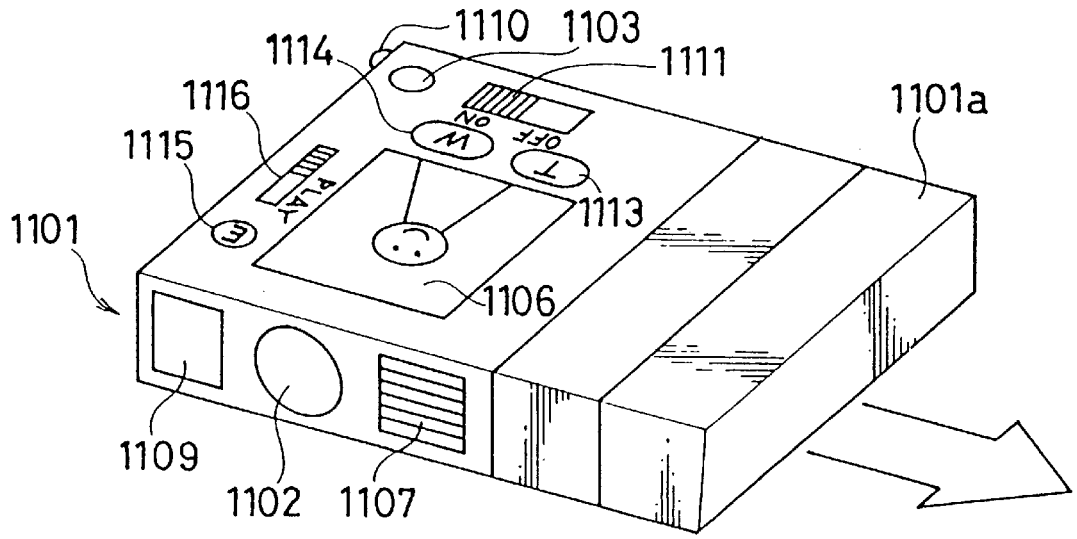
FIG. 12A is a perspective view illustrating a second camera capable of recording and reproducing a photographed image according to the present invention, a printer section of the second camera not being expanded.
Figure 12B:
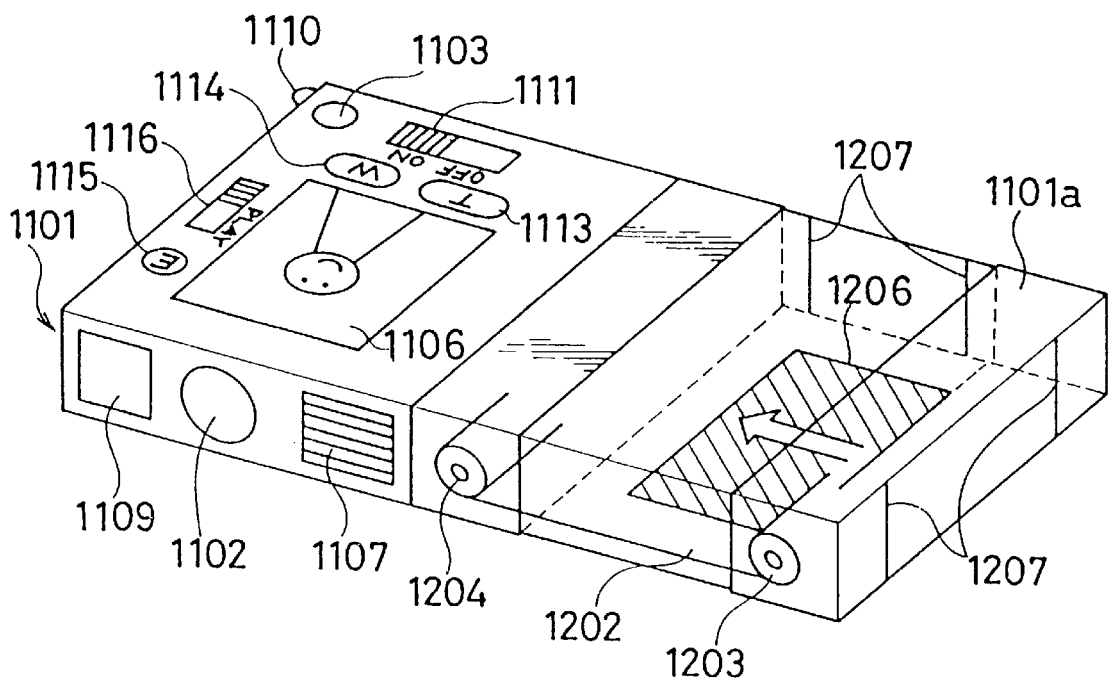
FIG. 12B is a perspective view illustrating the second camera, the printer section being expanded.

FIGS. 12A and 12B show a second camera of the present invention having a built-in printer.

FIG. 12A is a perspective view of the second camera showing a printer section of the second camera not expanded. FIG. 12B is another perspective view of the second camera showing the printer section expanded.

Common part numbers are used in FIGS. 12A and 12B to identify the same parts.

Provided on front of the camera body 1101 are an object lens 1102 with switchable focal distance, a flash aperture 1107 and a viewfinder lens 1109. At an approximate position on a top of the camera body 1101 is provided a display window 1106 including a LCD. When photographing a subject with the camera, the display window 1106 indicates the photography mode status, the frame number, a warning against saturation of the internal memory capacity of the camera, etc. On the other hand, the display window 1106 shows the print mode status, the frame number of the printed image, print in process and print complete status indications as well as the image reproduced from the internal memory of the camera during the print process.

Also, provided on the top of the camera body 1101 are a dual-function start button 1103 which works as a photographing start button when photographing an image and as a printout start button when printing an image, an ON/OFF switch 1111 adopted for turning on and off the camera, switches 1113 and 1114 adopted for setting the object lens 1102 to the telephoto and wide-angle focal positions, respectively, when photographing a subject, an erasure switch 1115 adopted for erasing an image stored in the internal memory, and a TV output on/off switch 1116.

A TV output terminal 1110 is provided on a side of the camera body 1101.

The switches 1113 and 1114 are also adopted to sequentially advance the frame in a normal and, reverse order, respectively, when printing or reproducing recorded images on the TV screen.

A movable member 1101a is provided on a side of the camera body 1101 for accomodating a built-in printer, which is withdrawn in the direction of an arrow when printing.

Referring to FIG. 12B, a thermal printhead (shown at 1201 in FIGS. 15A and 15B), a thermal transfer ink film 1202 and a printing frame 1206 (hatched part), or an opening located at an appropriate lower position facing external printing paper, come into view when the movable member 1101a is drawn out. If the printout start button 1103 is pressed in this state, the thermal printhead 1201 starts to scan while moving in the arrow direction. Thus, the desired image is printed on paper placed just beneath the printing frame 1206. The thermal transfer ink film 1202 is supplied from a supply roller 1203 toward a take-up roller 1204. The thermal transfer ink film 1202 has a sufficient width to cover the printing frame 1206. The thermal printhead 1201 used in the second camera is of a one-dimensional type, of which longer axis is parallel with the side of the printing frame 1206 (or perpendicular to the arrow direction shown).

To indicate the printing position to the operator, paper positioning lines 1207 are marked on the rear and right sides of the movable member 110a. The paper positioning lines 1207 are marked on the rear and right sides of the movable member 1101a at exact positions where the edges of the printing frame 1206 in both the longitudinal and lateral directions are projected. Such paper positioning marks are not necessarily required to indicate the edges of the printing frame 1206 but may indicate the centers of its sides or the whole printing area.

Figure 13:
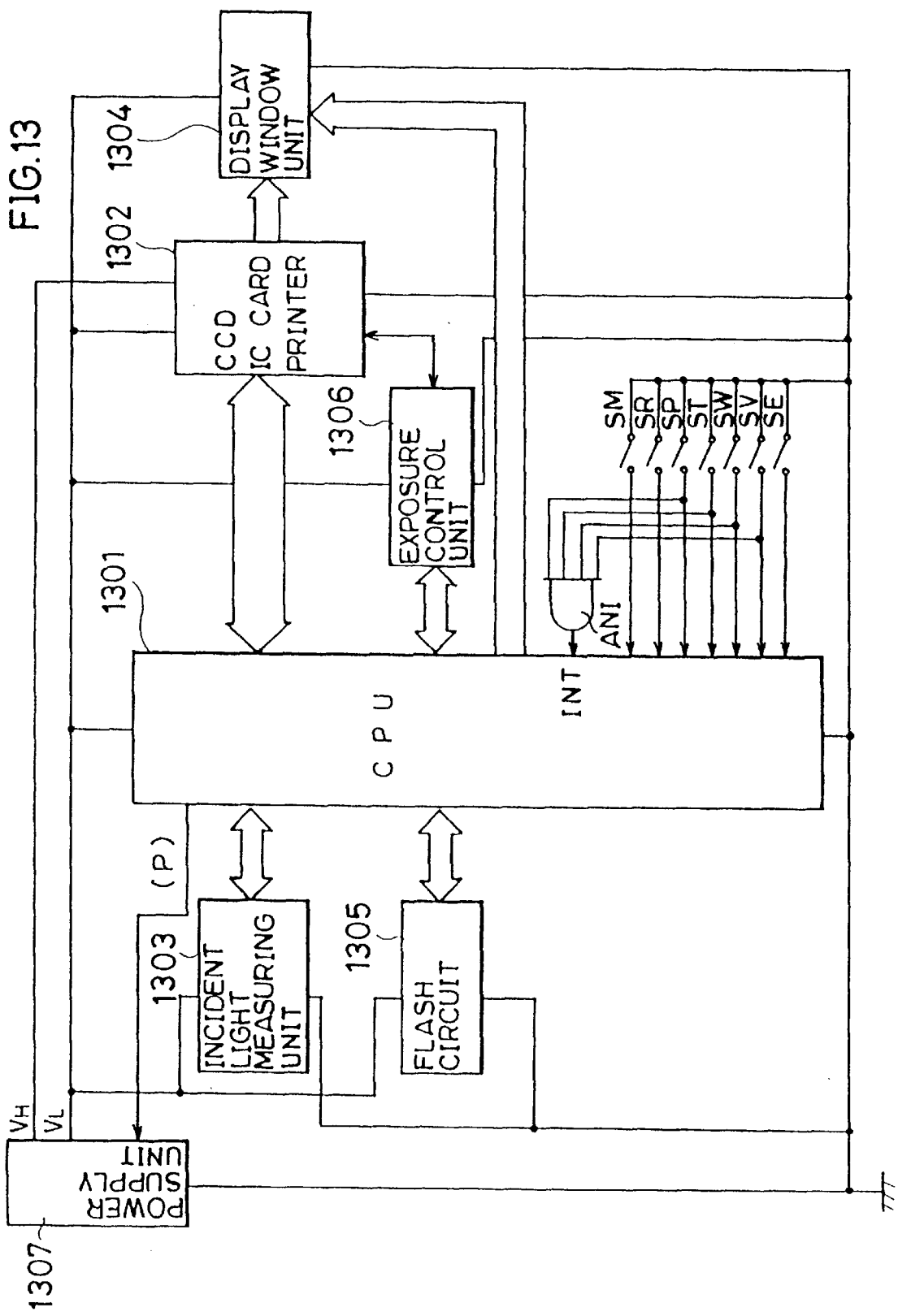
FIG. 13 is a system configuration diagram of the second camera.

FIG. 13 is a block diagram of the second camera.

Referring to FIG. 13, a system controller 1301 (hereinafter called the CPU) and a power supply unit 1307 correspond to the system controller 301 and the power supply unit 307 shown in the first camera, respectively, and they perform the same operations in principle. Indicated at 1302 is a unit comprising a solid state image pick-up device (hereinafter called the CCD) into which a photographed image is stored and associated circuits which drive the CCD and perform processing of an input image, recording of image data into an internal memory and printing operations.

Switches SM through SE perform the same operations as switches SM through SE (with the only exception of a switch SC) described in the first camera.

Namely, the switch 1103 corresponds to a switch SR, the switch 1111 corresponds to switch SM, the switch 1113 corresponds to a switch ST, the switch 1114 corresponds to a switch SW, the switch 1115 corresponds to a switch SE, and the switch 1116 corresponds to a switch SV. Also, a switch SP is activated when the movable member 1101a is withdrawn from the camera body. The second camera is not provided with the switch SC of the first camera because the second camera is not mountable with an IC card.

The start switch SR and switches ST and SW are changed by the CPU 1301 in accordance with the positions of the movable member 1101a. The positions of the movable member 1101a are detected based on outputs of the switch SP. Since the outputs of the switches SP, ST, SW and SV are connected to the inputs of an AND circuit AN1, interrupt (INT) operations to be described later are carried out if any of these switches is turned on.

Figure 14:
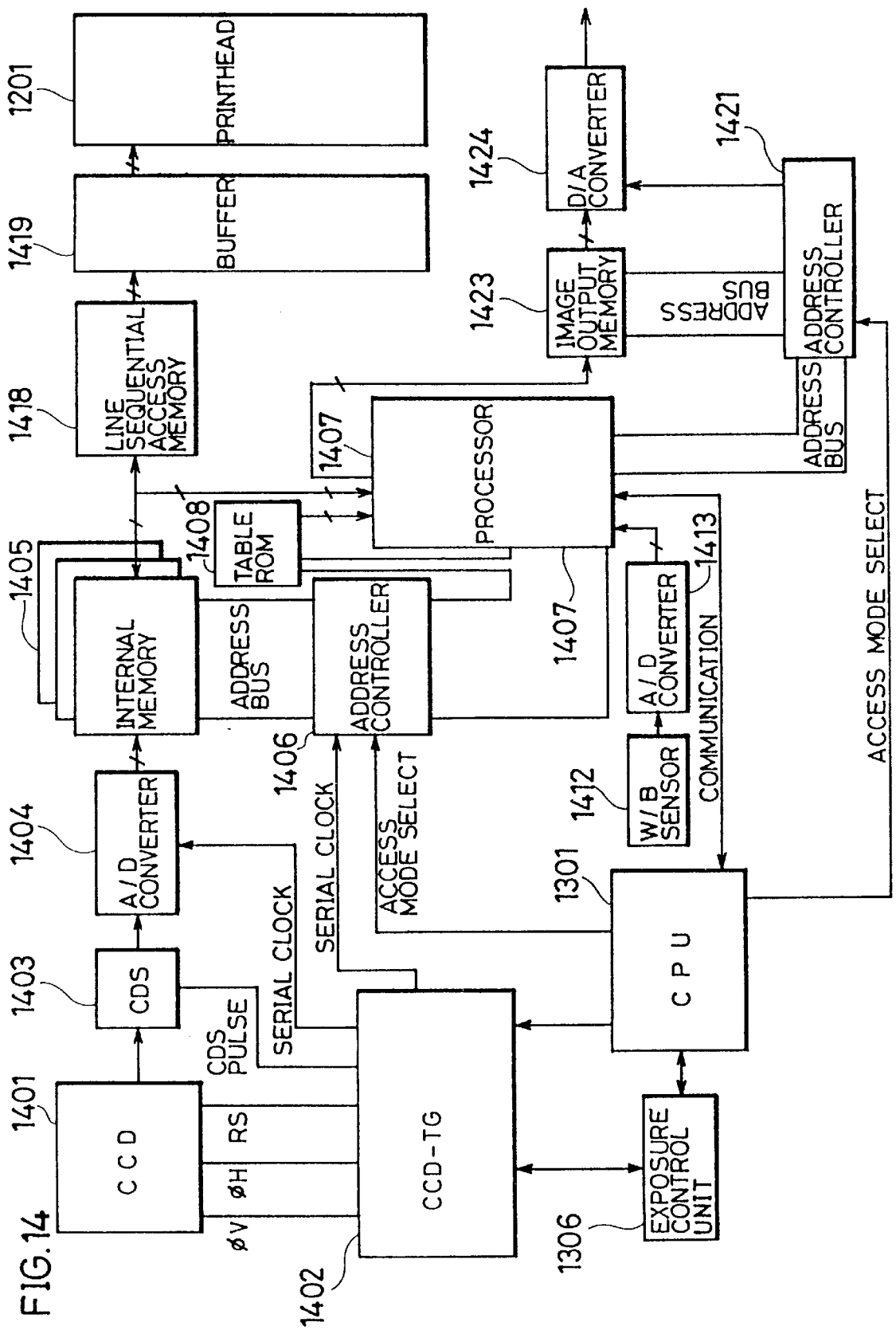
FIG. 14 is a block diagram showing an internal circuit structure of a unit 1302 shown in FIG. 13, including a CCD, memory and a printer section.

Next, FIG. 14 is a unit diagram of the CCD, memory and printer section. FIG. 14 corresponds to FIGS. 4 through 6 of the first camera.

Referring to FIG. 14, CCD 1401 through table ROM 1408, WB sensor 1412 and A/D converter 1413 correspond to the CCD 401 through table ROM 408, WB sensor 412 and A/D converter 413 of the first camera, respectively. Also, line sequential access memory 1418, buffer 1419, printhead 1201, address controller 1421, image output memory 1423 and D/A converter 1424 correspond to the line sequential access memory 418, buffer 419, printhead 201, address controller 421, image output memory 423 and D/A converter 424 of the first camera, respectively.

Now, photographing, printout and TV output operations are described below.

(1) Photographing operation

When the start switch SR is turned on in the photography mode, the CPU 1301 outputs a start signal to CCD-TG 1402 while causing the light measuring unit 1303 to perform incident light measurement. The exposure control unit 1306 controls exposure of the camera according to the aperture setting value Av obtained from the result of light measurement. Then, it introduces light upon CCD 1401 by outputting a shutter control signal to CCD-TG 1402 depending on the exposure time data Tv.

Upon completion of the above exposure process, the CPU 1301 switches the address controller 1406 so as to output a serial signal. The CPU 1301 also outputs a read enable signal to CCD-TG 1402. Consequently, the image data read into CCD 1401 are transferred to the internal memory 1405. When data transfer has been finished, the CPU 1301 switches the address controller 1406 to the processor side 1407 to perform communications. The CPU 1301 then outputs command signals to apply signal processing to the image data, as described in detail later with reference to a flowchart of FIG. 17. The processed image data are stored again in the internal memory 1405.

One photographing cycle is completed by the above procedure. Thereupon, the CPU 1301 requests the address controller 1406 to switch the write address of the internal memory 1405 to the next frame and waits for the start of the succeeding photographing cycle.

(2) Printout operation

The CPU 1301 starts a printout operation upon detecting a print start command signal in the print mode.

First, the CPU 1301 causes the address controller 1406 to select a page in the internal memory 1405 where the image to be printed is stored and then, sends a command signal to the processor 1407 requesting it to carry out signal processing for printing.

Upon receiving a command signal from the CPU 1301, the processor 1407 performs correction at first, and then reads the image data out of the internal memory 1405. Subsequently, the processor 1407 performs the aforementioned area quantization to individual ink colors in the order of Cy (cyan), Ye (yellow), Mg (magenta) and Bk (black). In this signal processing, image data of cyan is generated at first. Then, it is area quantized by use of the data programmed in the table ROM 1408, and the resultant data is written in the line sequential access memory 1418. Each time the above signal processing is completed for one line of print data, the processor 1407 transmits a process end signal to the CPU 1301. Upon detecting the end of processing of one line of image data, the CPU 1301 executes printout of that one line by controlling the buffer 1419 and thermal printhead 1201. Each time printout of one line is completed, the CPU 1301 carries the thermal printhead 1201 one line forward in the direction of an arrow shown in FIG. 12B to prepare for printout of the succeeding line. Printout of one frame of a single color image is accomplished in this manner. After printout of the Cy (cyan) image is completed, the Ye (yellow), Mg (magenta) and Bk (black) images are printed in this order by repeating the similar printing process. Printout of one complete image is finished in this manner.

As an alternative to the above process, the thermal printhead 1201 may be advanced one line forward after printing each line with all four colors. In this alternative printing manner, one frame of image is completed by a single longitudinal scanning.

(3) TV output operation

When the TV reproduction mode is selected, the CPU 1301 detects a change of mode and starts reproduction of an image on the TV screen. The CPU 1301 causes the address controller 1406 to select a frame in the internal memory 1405 where the image to be reproduced on the TV is stored. On the other hand, the CPU 1301 enables the processor 1407 and address controller 1421 to communicate with each other and sends a command signal to the processor 1407 requesting it to perform necessary signal processing for reproduction of image on the TV screen.

Upon receiving the command signal from the CPU 1301, the processor 1407 reads the image data one line after another out of the internal memory 1405. The processor 1407 then applies the signal processing described later to the image data and writes the resultant NTSC signal in the image output memory 1423. At this time, horizontal and vertical synchronizing signals are added to the image data. In case the original image consists of a field picture of half the normal horizontal line density, a pseudo-frame image processing is applied to the image data when it is written in the image output memory 1423, so that it looks as if one complete frame of image is recorded in the image output memory 1423. The processor 1407 outputs a process end signal at the end of processing of each individual frame image. After detecting the process end signal, the CPU 1301 switches the address controller 1421 to the NTSC output mode. Thereupon, the image output memory 1423 is set to output an NTSC signal, and the D/A converter 1424 is activated to output an analog TV signal.

Photographing, printing and output to the TV are executed in the respective modes described above.

Figure 15A:
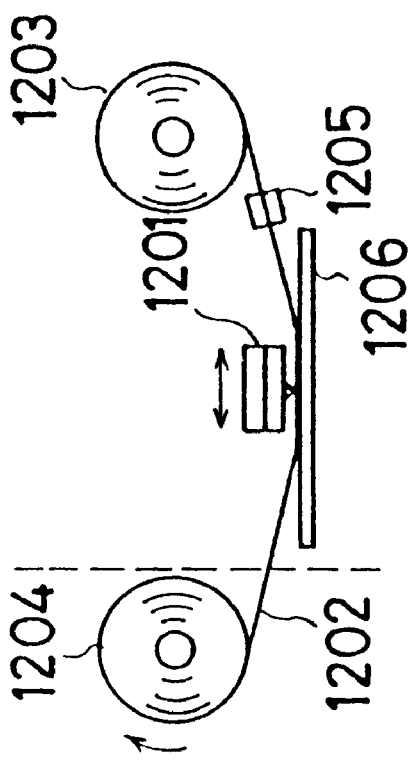
FIG. 15A is a diagram illustrating the printer section before printing.
Figure 15B:
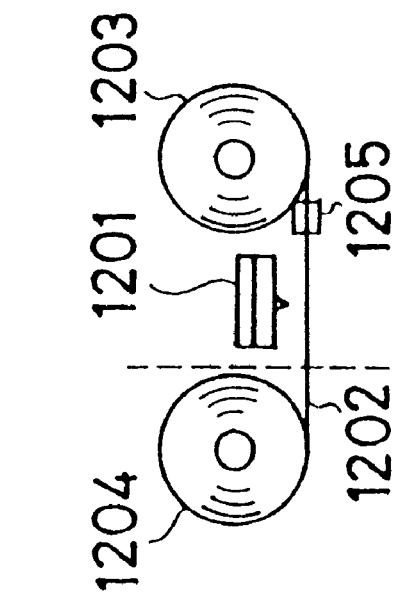
FIG. 15B is a diagram illustrating the printer section during printing.

FIGS. 15A and 15B illustrate cross sections of principal parts of the printer section to show operation of the thermal printhead 1201.

Referring to FIGS. 15A and 15B, indicated at 1201 is the thermal printhead, indicated at 1202 is the afore-mentioned thermal transfer film, indicated at 1203 is the supply roller of the thermal transfer ink film 1202, and indicated at 1204 is the take-up roller of the thermal transfer ink film 1202. As an example, cyan, yellow, magenta and black ink areas are arranged in order on the surface of the above-mentioned thermal transfer ink film 1202 at regular intervals as shown in FIG. 10. The recurring interval of different ink areas is made equal to or longer than the length of the print area. Indicated at 1205 is a color detecting sensor for discriminating the ink color just under the thermal printhead 1201. With this color discrimination system, individual color images are printed with the respective color signals output from the line sequential access memory 1418 to the thermal printhead 1201.

FIG. 15A shows a state in which the print mechanism is started for printing, in other words, an image is being photographed. The take-up roller 1204 and take-up drive mechanism (not shown in the drawing) are incorporated in the camera body but other than in the movable member 1101*a* shown in FIG. 12B. On the other hand, the supply roller 1203, thermal printhead 1201, color detecting sensor 1205 and the associated drive mechanism are built in the movable member 1101*a* as shown in FIG. 12B.

Next, FIG. 15B shows a state in which the movable member 1101*a* is withdrawn from the camera body 1101. A print operation is performed by scanning the thermal printhead 1201 while it is kept in contact with the thermal transfer ink film 1202. The supply roller 1203 still remains inside the movable member 1101*a* in this state whereas the thermal printhead 1201 scans the printing frame 1206 while moving in the arrow direction. A complete printout of a photographed image is obtained by repeating the scanning four times to superimpose four discrete color images.

A block diagram is omitted for this printer section because it is identical with the unit diagram shown in FIG. 11 and their operation is also the same.

The thermal printhead 1201 is not limited to a linear one-dimensional shape, but may be a point-shaped one. In the latter case, the mechanism control circuit 434 is designed in such a manner that it can control the printhead driving pulse motor 435 to drive the printhead in both the line and column directions throughout the effective print area to accomplish printing of one complete image. As an alternative to the above process, the printhead 1201 may be advanced one line forward after printing each line with all four colors. In this alternative printing manner, one image frame is completed by a single longitudinal scanning.

Figure 16:
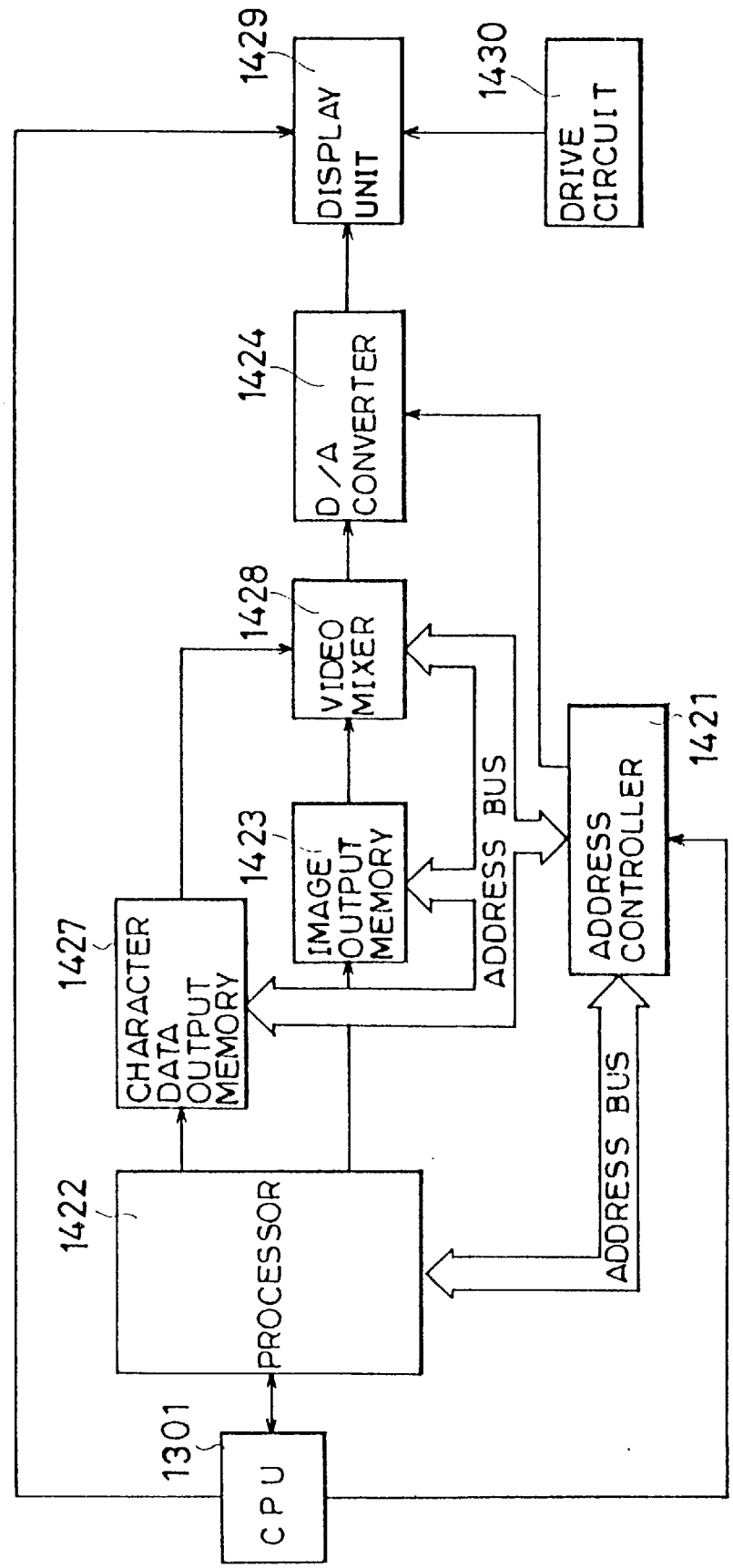
FIG. 16 is a block diagram of a circuit for providing a monitoring image on a display window.

FIG. 16 is a block diagram of a circuit for providing a monitor image on the display window 1106. This block diagram corresponds to the block diagram of FIG. 6. Blocks identical to those shown in FIG. 14 carry the same reference numerals as those of FIG. 16.

Character data output memory 1427 is a RAM, for example, in which various kinds of character data sent from the CPU 1301 such as frame number, print in process or print complete status to be shown on the display window 1106 together with an image are written. A character generator may be used as a substitute for RAM to output appropriate character data according to command signals received from the CPU 1301.

The purpose of video mixer 1428 is to generate an image frame by combining the image data output and character data output together. Provided with a display window 1106 as an integral part, a display unit 1429 is an LCD TV monitor, for example, which monitors the input signal from D/A converter 1424. Drive circuit 1430 scans the screen of the display window 1106 while applying a voltage to individual elements of the LCD.

Since the display window 1106 monitors an image when it is printed or reproduced on a TV screen, a stored image is presented on the display window 1106 each time the access switch ST or SW is turned on after the print mode detect switch SP or TV output switch SV is turned on.

Before a specific image is reproduced, image data processed to be output to the TV is first stored in the image output memory 1423. This image data comes from a memory area of a specific frame number in the internal memory 1405, whichever selected by the access switch ST or SW.

On the other hand, on-screen alphanumeric data, such as a frame number, print in process or print complete status information received from the CPU 1301 are processed in the processor 1407 and stored in the character data output memory 1427. Then, the alphanumeric data output from the character data output memory 1427 and the image data output from the image output memory 1423 are combined into a single picture in the video mixer 1428. As a result, each image is displayed with its frame number. The mixed image data are delivered through the D/A converter 1424 to the display unit 1429 for on-screen presentation. When the start switch SR is turned on after the image is presented on the display window 1106, as explained above, the same image is printed through the afore-mentioned procedure.

Now, operations of the first and second cameras will be described in accordance with flowcharts shown in FIGS. 17A through 21.

It will be noted that components mentioned in the following descriptions refer not only to the components of the first camera but also to the components of the second camera although the later-mentioned components carry reference numerals of the first camera.

Operation of the camera is controlled by the CPU 301 and a program stored in a ROM (not illustrated) connected to the CPU 301.

Figure 17A:
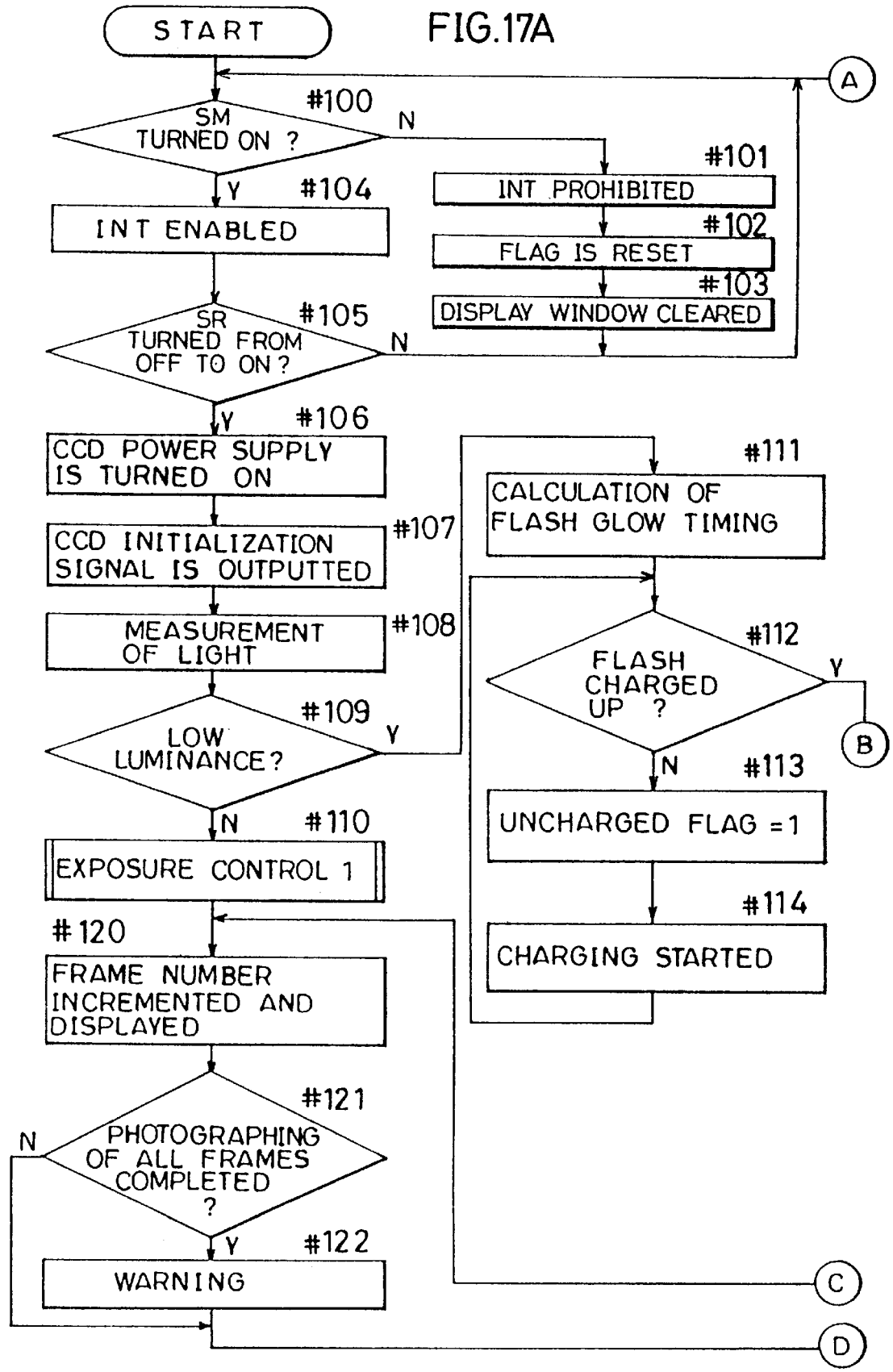
FIGS. 17A–21 are flowcharts showing operations of the first and second cameras.
Figure 17B:
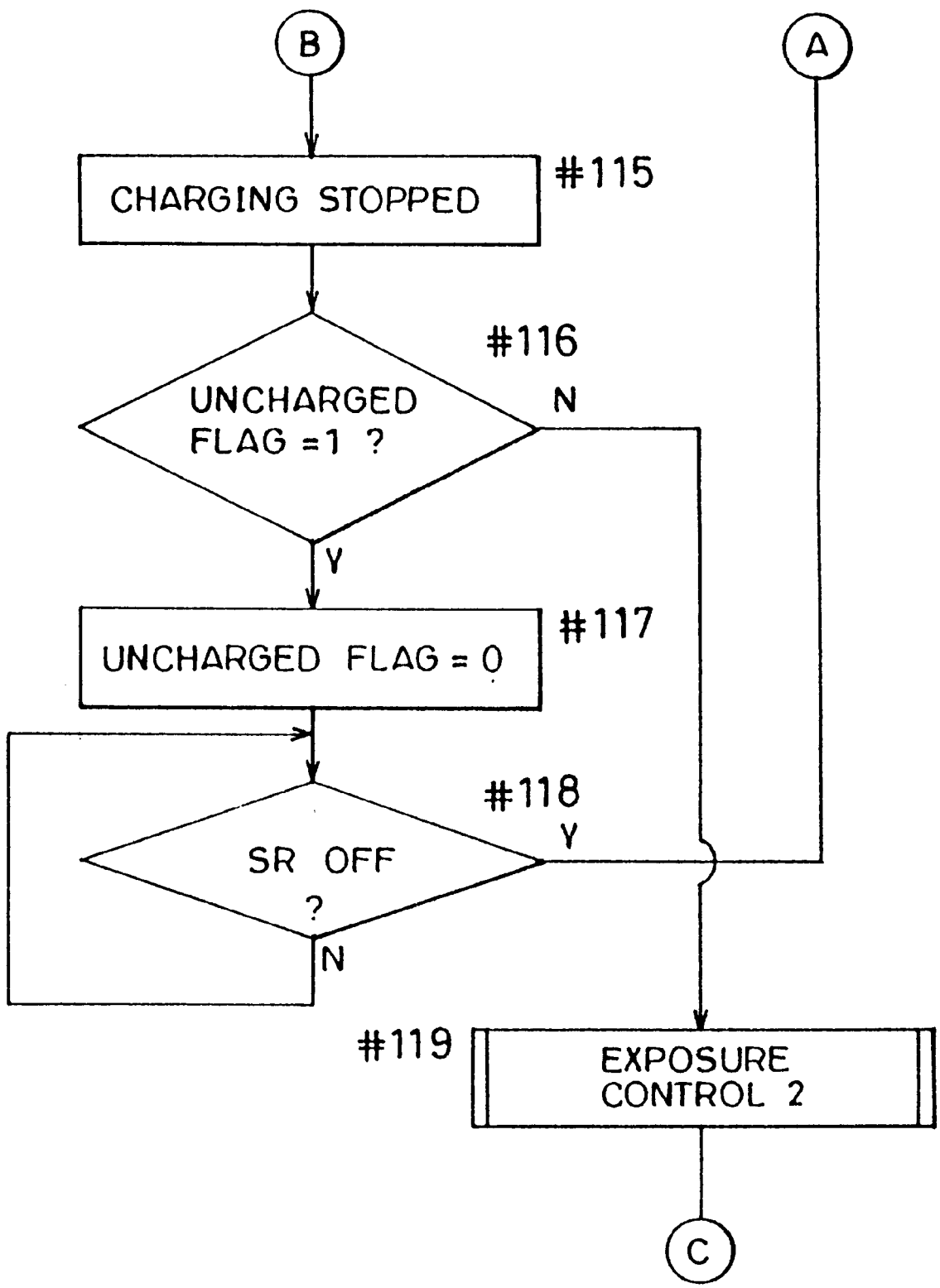

A START routine shown in FIGS. 17A and 17B is executed when a power supply is mounted to the camera body 101.

More specifically, it is checked whether the main switch SM is turned on at first (#100). If the main switch SM is in the OFF-state (No in Step #100), this routine proceeds to Step #101 and prohibits any interrupt operation and then, resets the flag in Step #102. If any image or message is displayed on the display window 106 or indicator 117, the indications are cleared (#103), and this routine returns to Step #100 and waits until the main switch SM is turned on. When the main switch SM is turned on (Yes in Step #100), or if it has already been in the ON-state when the power supply is mounted, an interrupt operation is allowed (#104) and this routine proceeds to Step #105.

In Step #105, it is checked whether the start switch SR is turned on. If the start switch SR is not turned on (No in Step #105), this routine returns to Step #100, and repeats Steps #100 through #104. If, however, the start switch SR is turned on (Yes in Step #105), CCD 401 is powered on (#106). In short, the power supply unit 307 provides a high voltage VH to the CCD upon receiving a signal (P) sent from the CPU 301. As soon as the power is supplied, a command signal is output to CCD-TG 402 to initialize CCD 401 so as to remove residual charges in CCD 401 (#107). Next, the light measuring unit 303 measures incident light in order to calculate exposure time Tv and aperture setting value Av (#108). Also, the subject is checked to see if it is a low luminance object or not (#109) based on the light measurement data. In case the subject is judged to be a low luminance object (Yes in Step #109), flash glow timing is calculated from the light measurement data (#111) in order to use the electronic flash when photographing. Next, it is checked whether a charging capacitor in the flash circuit 305 is charged with sufficient electric energy. If it is not fully charged (No in Step #112), an uncharged flag is set to "1" to start charging (#113, #114). This routine proceeds to Step #115 upon completion of charging (Yes in Step #112). Charging is stopped (#115) when it has been verified that the capacitor has been fully charged in Step #112, and in Step #116, it is checked whether the uncharged flag is set to "1". If the uncharged flag has already been set to "1" (Yes in to Step #116), it is set to "0" in Step #117 and this routine is kept in standby until the start switch SR is turned off (#118). When the start switch SR is turned off (Yes set to Step #118), this routine returns to Step #100 and the so-called release lock is carried out. On the other hand, if the uncharged flag is set to "0" in Step #116, this routine proceeds to Step #119 and a sub-routine titled "Exposure control 2", shown in FIGS. 20A and 20B, is executed.

Figure 20A:
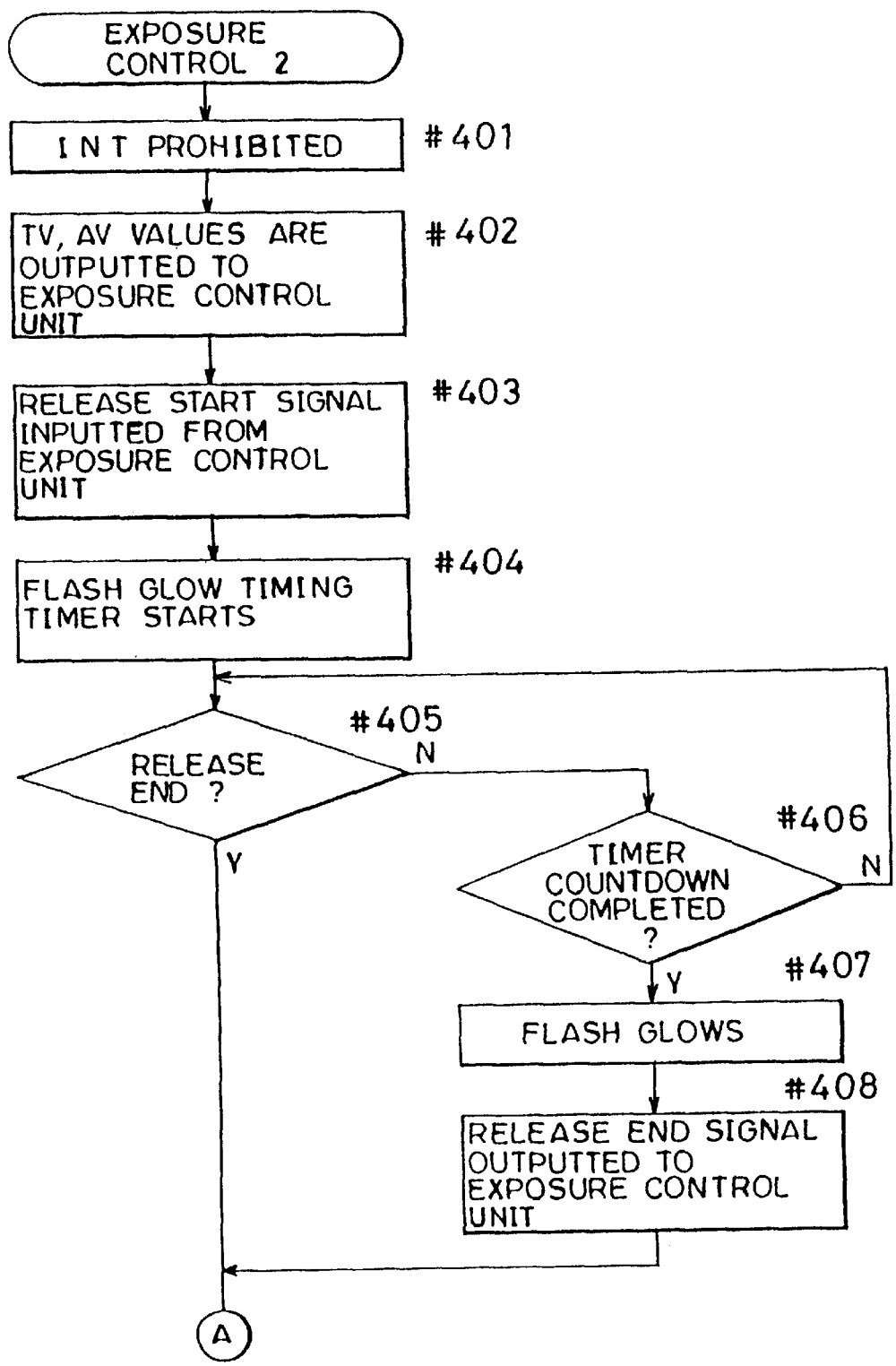
Figure 20B:
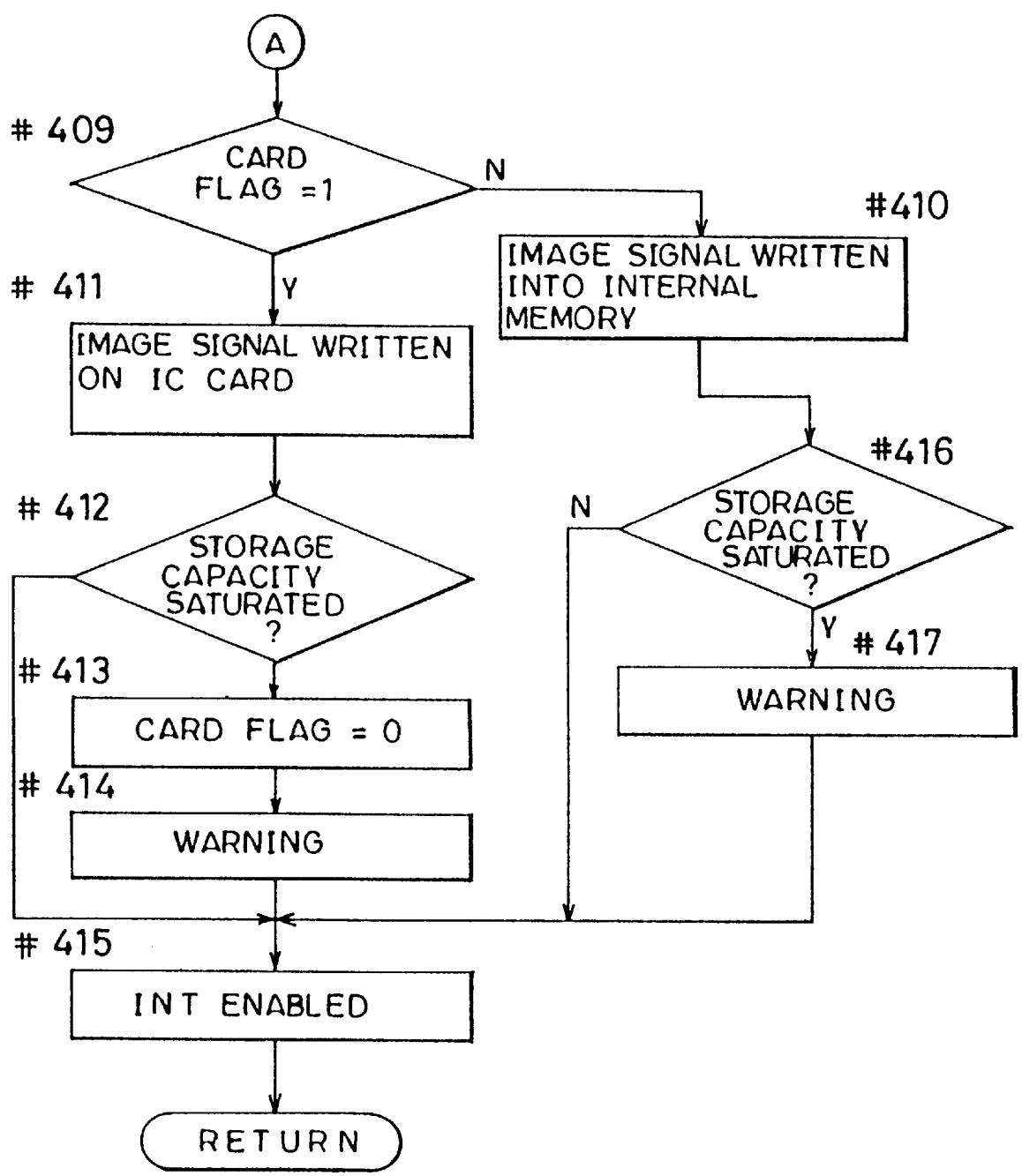

Now, referring to FIGS. 20A and 20B, any interrupt operation is prohibited in Step #401 at first, and exposure time Tv and aperture setting value Av calculated from the above-mentioned light measurement data are output to the exposure control unit 306 (#402). Based on these data, the exposure control unit 306 drives the diaphragm of the camera 101 and exposes CCD 401 by outputting a shutter control signal to CCD-TG 402 according to exposure time Tv. When a signal indicating the start of release (start of exposure) has been received from the exposure control unit 306 (#403), its internal timer is started (#404) according to the flash glow timing obtained in Step #111. The electronic flash is designed to glow after a certain time has elapsed from the start of exposure of CCD 401. Next, it is checked whether a release end signal has been received from the exposure control unit 306 (#405). This judgment is made because the above-mentioned exposure time Tv is just an estimated value. If the luminance of the subject suddenly increases while the flash glow timer is counting down, the exposure control unit 306 may output a release end signal even though the flash glow timing has not been reached. Accordingly, the purpose of the above process is to terminate the exposure operation without causing the electronic flash to glow in case the exposure control unit 306 has output a release end signal before the flash glow timing is reached (No in Step #406 and Yes in Step #405). In contrast, if the flash glow timing is reached before the release operation is completed (Yes in Step #406), the electronic flash is caused to glow and a release end signal is output to the exposure control unit 306 (#407, #408) to terminate the exposure operation.

When the above exposure process has been completed, it is checked whether a card flag is set to "1" in Step #409. If the value is "1" (Yes in Step #409), the image signal read into CCD 401 is written to the IC card 110 mounted on the camera (#411). If the flag is "0", the image signal from CCD 401 is written to the internal memory 405 of the camera 101 (#410).

It will be noted that in the second camera, this routine skips directly from Step #408 to Step #410 since the second camera is not provided with an IC card. When the storage capacity of the internal memory 405 is saturated (Yes in Step #416), a visual or an audible warning is generated (#417).

It is checked whether the storage capacity of the IC card 110 is saturated after the image signal has been written to the IC card 110. If it is saturated (Yes in #412), the card flag is set to "0" in Step #413 while a warning is produced in Step #414. The internal memory 405 can be linked to the IC card 110 so that the photographer is alerted of saturation of the IC card 110, and the photographed image signal overflowing thereafter is written to the internal memory 405 instead of the IC card 110. On completing the above processes, this sub-routine returns to the main routine after enabling an interrupt operation in Step #415.

Figure 19A:
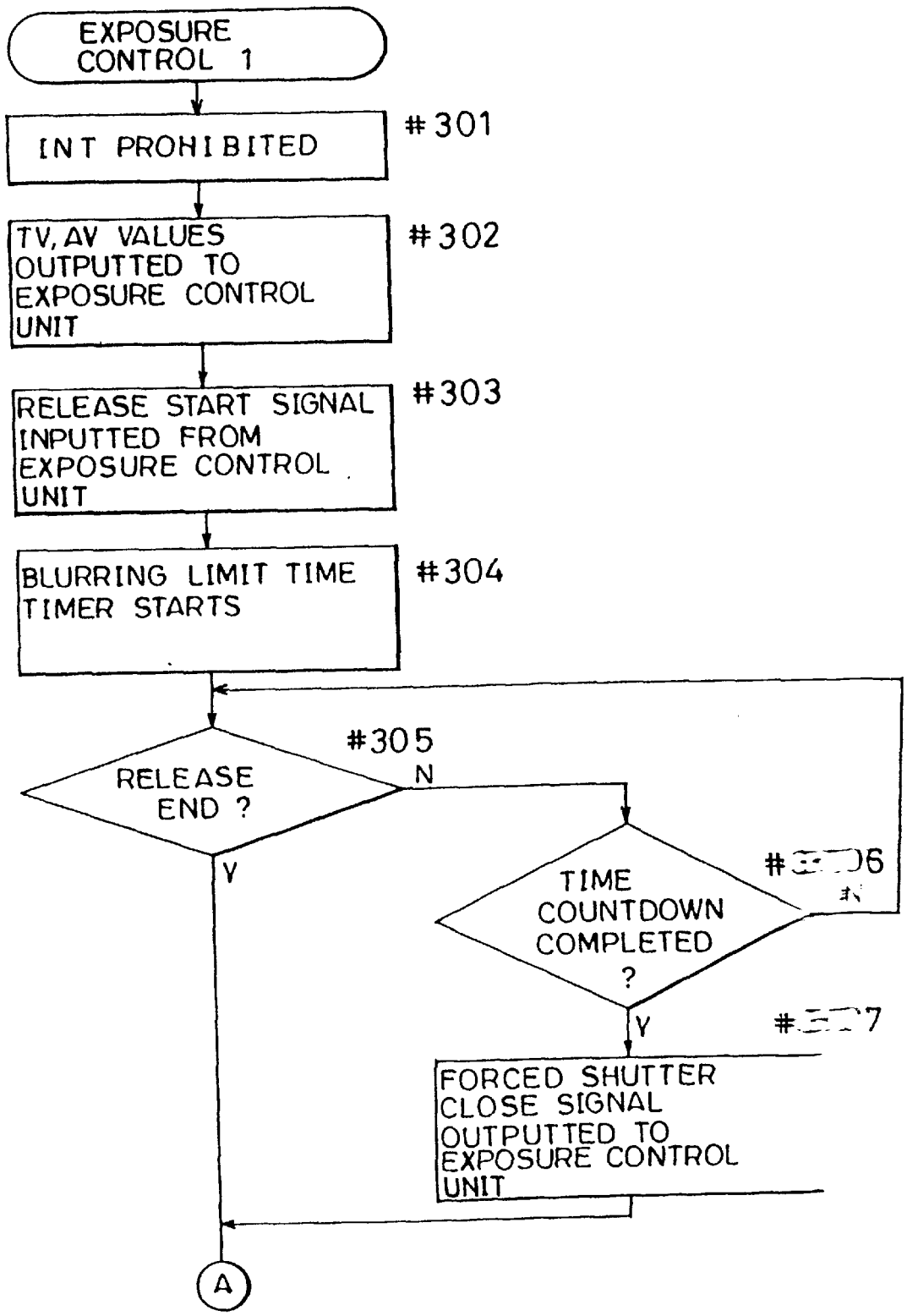

If the subject is judged not to be a low luminance object (No in Step #109), a sub-routine shown in FIGS. 19A and 19B, in which the electronic flash does not glow, is executed (#110).

Referring to FIGS. 19A and 19B, any interrupt operation is prohibited in Step #301 at first, and exposure time Tv and aperture setting value Av calculated from the aforementioned light measurement data are output to the exposure control unit 306 (#302). Based on these data, the exposure control unit 306 drives the diaphragm of the camera 101 and exposes CCD 401 by outputting a shutter control signal to CCD-TG 402 according to exposure time Tv. When a signal indicating the start of release (start of exposure) has been received from the exposure control unit 306 (#303), a timer is started to count a blurring limit time (#304). The blurring limit time, which defines the maximum exposure time within which photographing can be properly made without blurring, is counted in case a relatively long exposure time is required. After starting the timer, it is checked whether a release end signal is output from the exposure control unit 306 (#305) while the timer is counted down as in the case of flash assisted exposure explained earlier. If exposure time Tv is reached (No in Step #306) before the blurring limit time elapses, the exposure control unit 306 outputs a release end signal (Yes in Step #305) to terminate the exposure operation. On the other hand, if the timer completes countdown before the release operation is finished (Yes in Step #306), it is determined that the blurring limit time has been reached and a forced shutter close signal is output to the exposure control unit 306 (#307) to terminate the exposure operation.

When the above exposure process is completed, it is checked whether a card flag is set to "1" in Step #308 in the same manner as Steps #409 through #417 in the "Exposure Control 2" sub-routine. If the card flang is set to "1" (Yes in Step #308), the image signal stored in CCD 401 is written to the IC card 110 mounted on the camera (#310). If the card flag is set to "0", the image signal stored in CCD 401 is written to the internal memory 405 of the camera 101 (#309).

It will be noted that in the second camera, this sub-routine skips directly from Step #307 to Step #309 since the second camera is not provided with an IC card. When the storage capacity of the internal memory 405 is saturated (Yes in Step #315), a visual or an audible warning is generated (#316).

It is checked whether the storage capacity of the IC card 110 is saturated after the image signal is written to the IC card 110. If it is saturated (Yes in #311), the card flag is set to "0" in Step #312 while a warning is produced in Step #313. On completing the above processes, this sub-routine returns to the main routine after enabling an interrupt operation in Step #314.

Figure 17C:
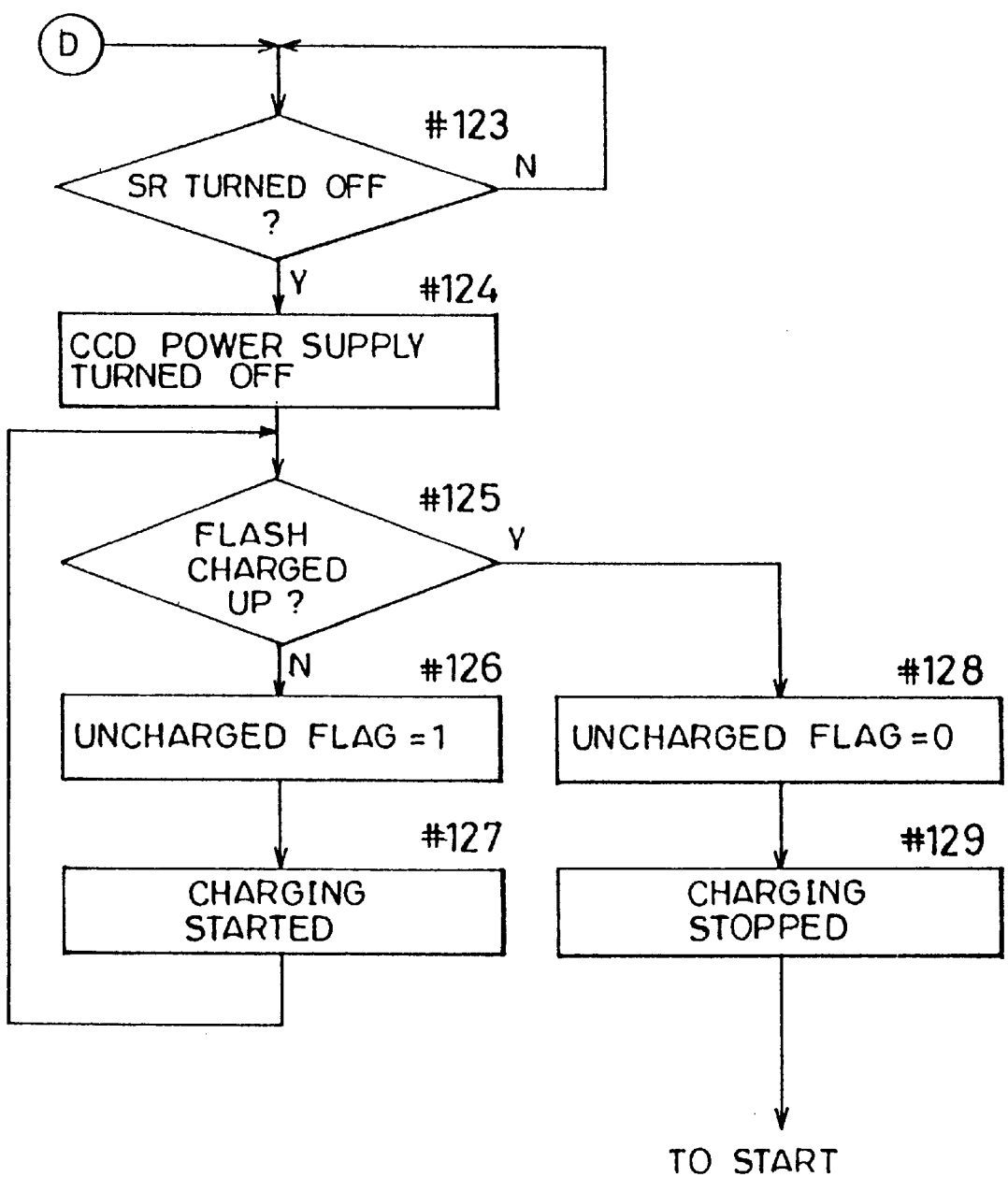
Figure 18A:
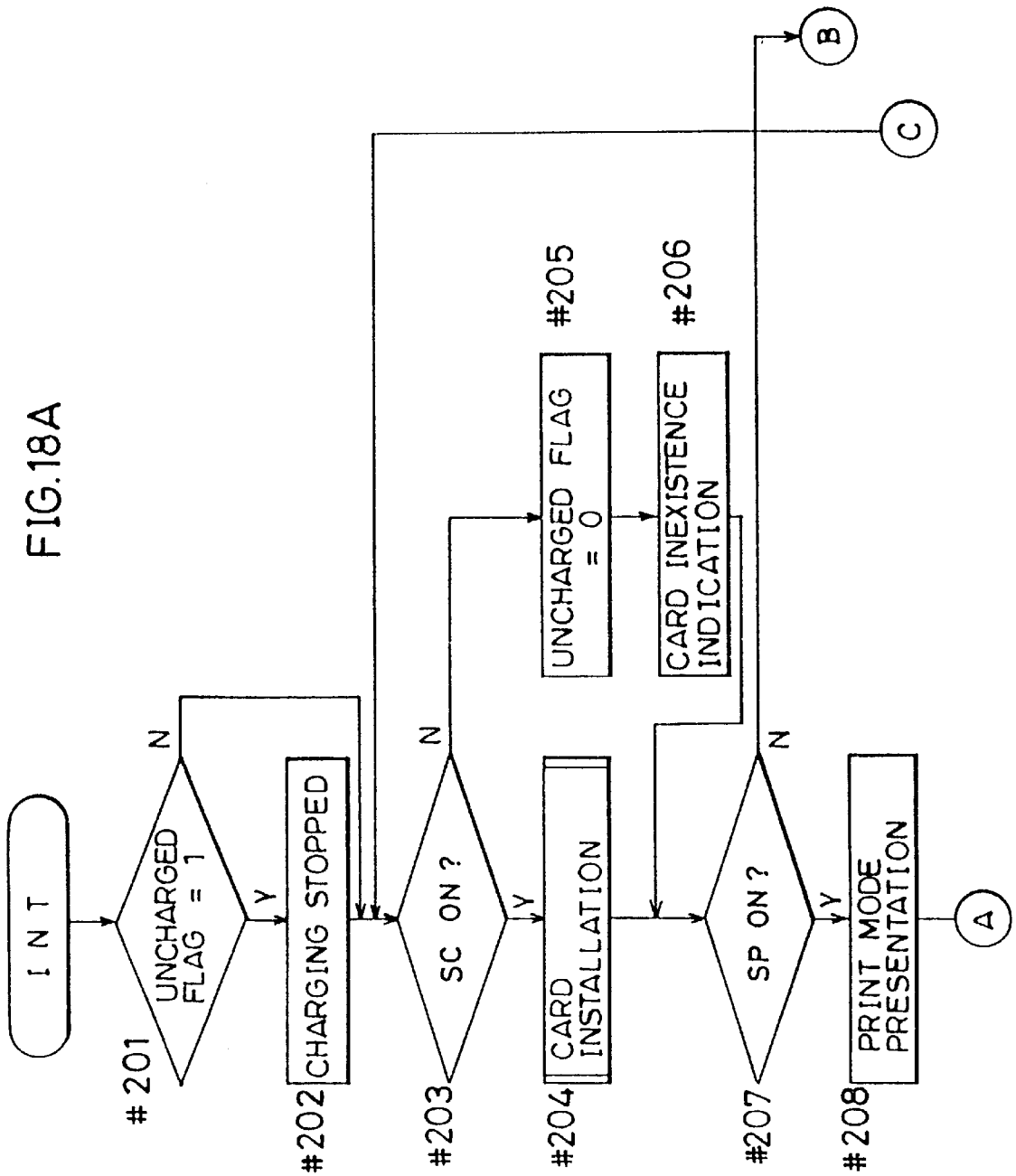
Figure 18B:
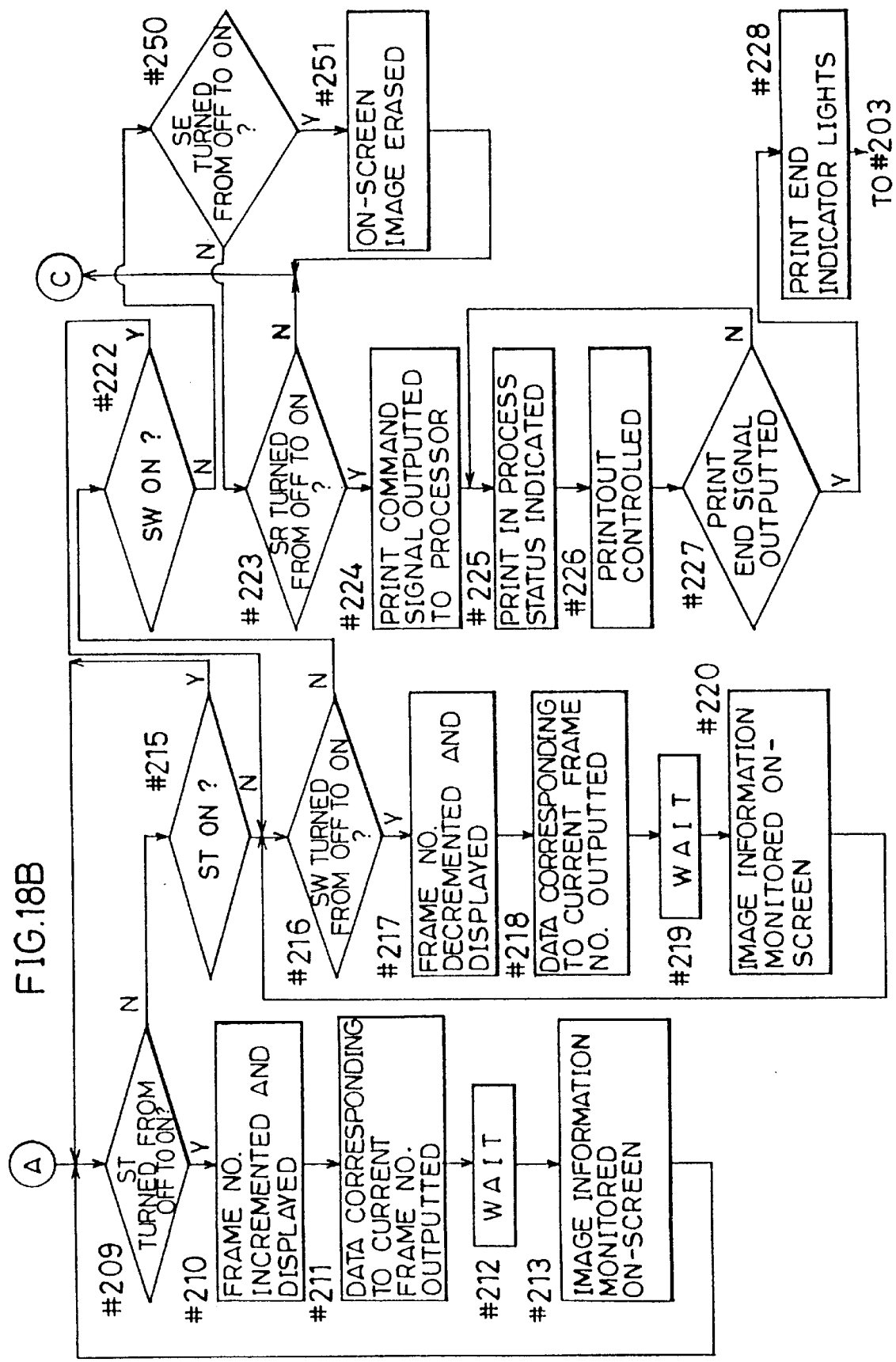
Figure 18D:
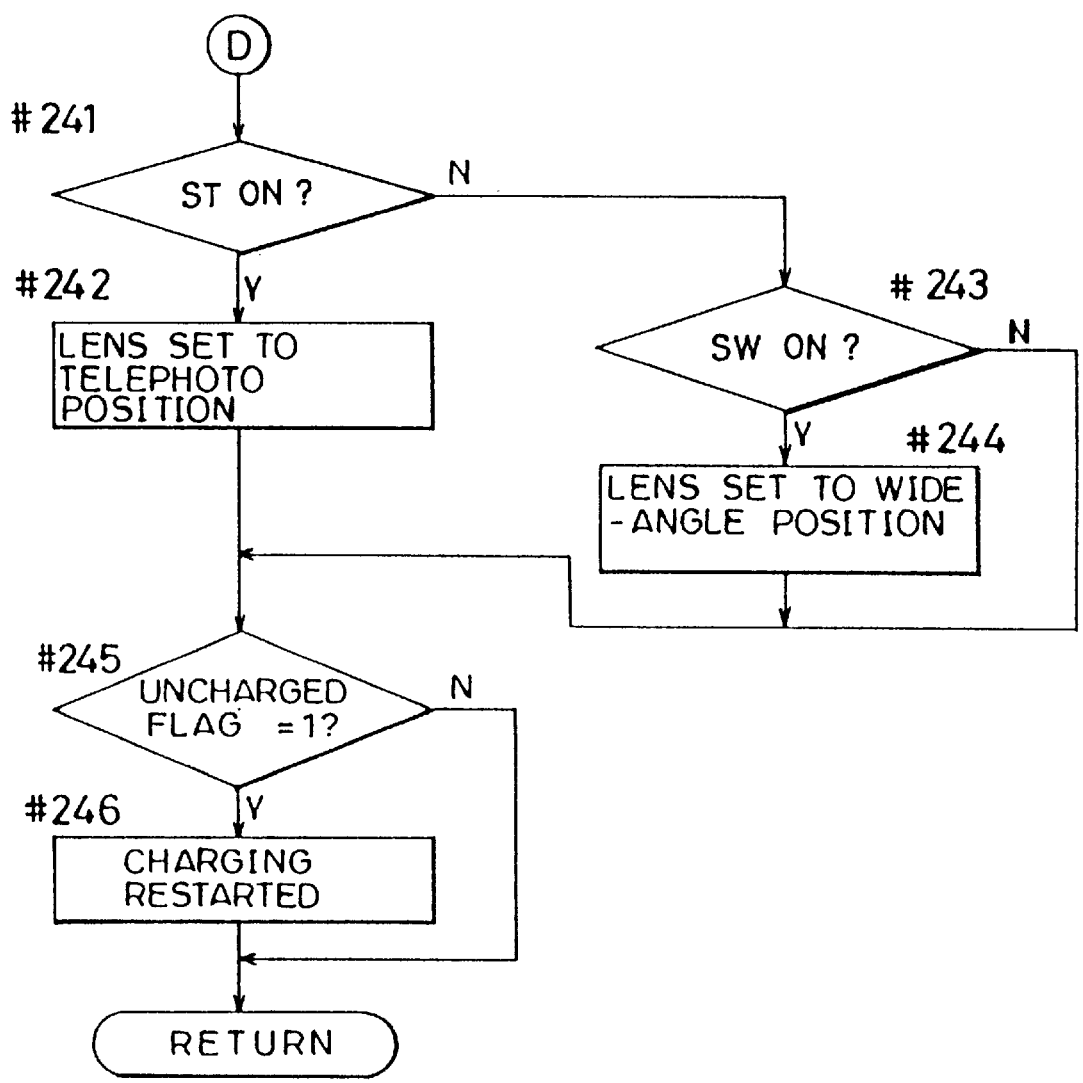

Now, referring again to the flowchart in FIGS. 17A, 17B, and 17C, upon completing the exposure control sub-routine of Step #110 or #119, the routine proceeds to Step #120 where the frame number is incremented by one and displayed on the indicator 117. It will be noted that in the second camera, various status indications are displayed on the display window 106 together with the image. When photographing of all the frames is finished and the storage capacities of the IC card 110 and internal memory 405 are saturated (Yes in Step #121), the photographer is alerted with a visual or an audible warning in Step #122. If images can still be stored, warning is not be generated.

Then, the routine proceeds to Step #123 and waits until the start switch SR is turned off. When the start switch SR is in OFF-state (Yes in Step #123), CPU 301 outputs a signal (P) to turn off the power supply to CCD 401 and finish photographing of one frame (#124). After the above steps, it is checked whether the electronic flash is already charged with sufficient electric energy to perform subsequent photographing (#125). If it is not fully charged (No in Step #125), an uncharged flag is set to "1" and charging is started to complete charging (#126, #127). When charging is completed (Yes in Step #125), the uncharged flag is set to "0" to stop charging (#128, #129). Thereupon, the routine returns to Step #100 and repeats the same sequence as Steps #100 through #129 explained above.

Referring to the flowcharts of FIGS. 18A through 18D, interrupt operations after Step #104 will be described.

An interrupt operation is executed when any of the following switches are turned on: the switch SC for detecting existence/inexistence of the IC card 110 (except for the second camera), the switch SP for detecting a transfer to the print mode, the switch SV for requesting reproduction of image on a TV screen, or the access switches ST and SW.

When an interrupt operation is executed, it is checked whether the uncharged flag has already been set to "1" in Step #201. If the value is "1", it is determined that an interrupt operation is commanded during the time that the capacitor is being charged. If the flag is "0", this interrupt routine skips Step #202 and it is checked whether the switch SC is in ON-state in Step #203. If the switch SC is still in OFF-state (No in Step #203), the card flag is set to "0" and it is determined that the IC card 110 is not mounted on the camera and an indication that the IC card is not mounted is displayed (#205, #206).

On the other hand, if the switch SC is in ON-state (Yes in Step #203), an IC card installation sub-routine is executed in Step #204. It will be noted that the second camera does not require Steps #203 through #206.

Figure 21:
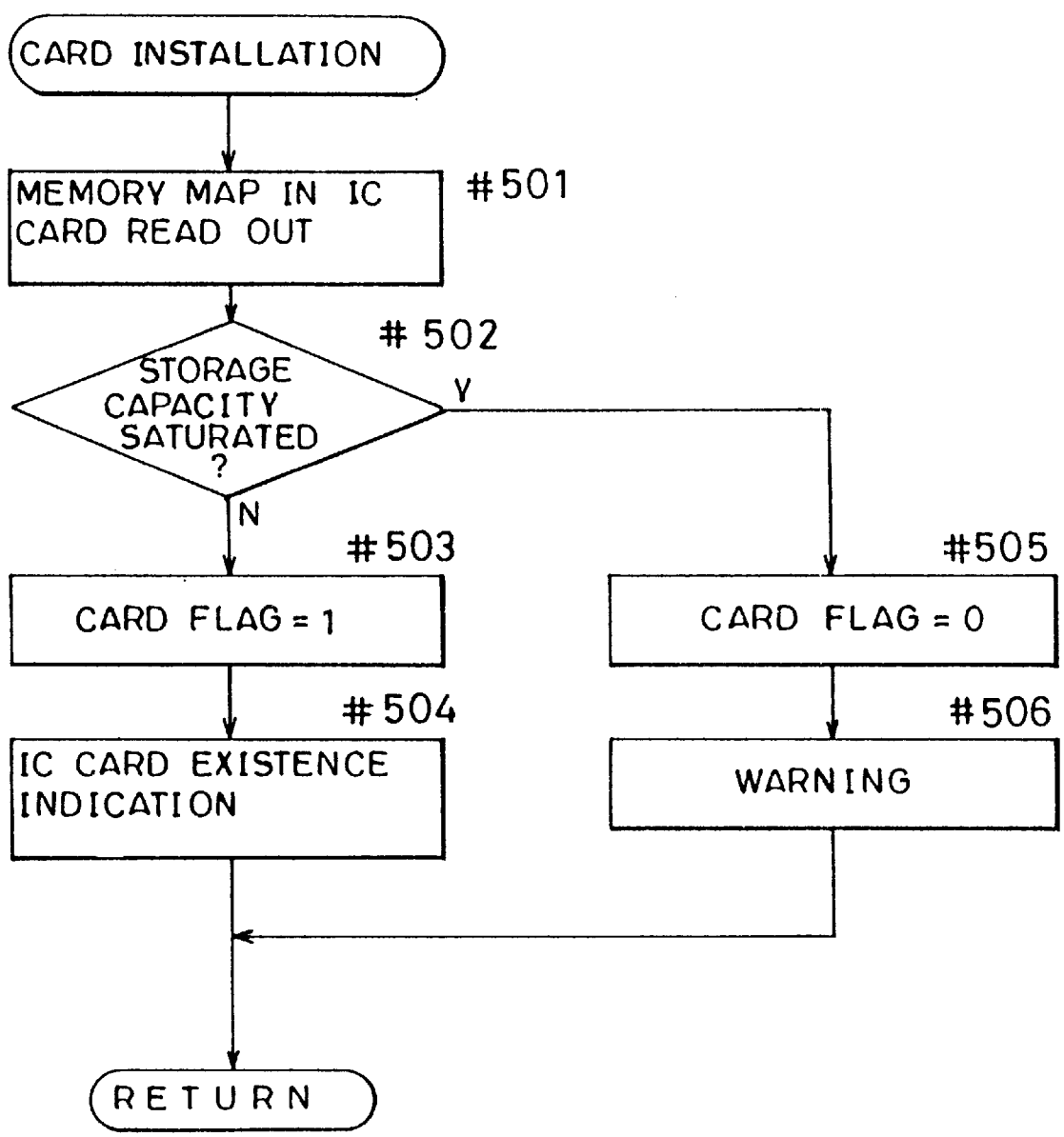

FIG. 21 is a flowchart showing the IC card installation sub-routine.

In Step #501 of this sub-routine, a memory map showing the status of image data storage in the IC card 110 is read out to check whether the storage capacity is already saturated, or whether an excess memory area is available to store more image data. If there is an area to store additional image data (No in Step #502), the card flag is set to "1" and an IC card existence indication is displayed (#503, #504). If the memory capacity of the IC card 110 is already saturated (Yes in Step #502), the card flag is set to "0" and a warning is given to the photographer (#505, #506). Subsequently, this sub-routine returns to the main routine.

Now, returning to FIGS. 18A through 18D, it is checked whether the switch SP is turned on. When the switch SP is in ON-state (Yes in Step #207), it is determined whether the camera is set in the print mode, and this routine proceeds to Step #208. If the switch SP is still in and OFF-state (No in Step #207), this routine proceeds to Step #229. In Step #208, an indication that the camera is in the print mode is displayed, and it is checked whether the access switch ST is turned on (#209). This routine proceeds to Step #210 when the access switch ST is in an ON-state (Yes in Step #209), and this routine proceeds to Step #215. When the access switch ST maintains its state or is turned off (No in Step #209), this routine proceeds to Step #215.

In Step #210, it is determined whether the access switch ST is pressed and the frame number is incremented by one and is presented on the indicator 117. On the other hand, the address controller 421 outputs the address data corresponding to the updated frame number in order to reproduce the image of the relevant frame number (#211). Waiting for a moment in Step #212 while the above operations are carried out, the display window 106 is operated to monitor the image information corresponding to the current frame number (#213). Then, this routine returns to Step #209, the frame number is incremented each time the access switch ST is pressed, and the corresponding image is presented on the display window 106. This routine repeats these steps each time the access switch ST is pressed. On the other hand, it is checked whether the access switch ST is in an ON-state in Step #215. This routine returns to Step #209 when the access switch ST is in ON-state (Yes in Step #215). This routine proceeds to Step #216 when the access switch ST is in an OFF-state (No in Step #215).

Next, this routine proceeds to Step #217 when the access switch SW is turned on (Yes in Step #216) instead of the access switch ST. When the access switch SW maintains its state or is turned off (No in Step #216), this routine proceeds to Step #222.

In Step #217, it is determined whether the access switch SW is pressed, the frame number is decremented by one and is presented on the indicator 117. On the other hand, the address controller 421 outputs the address data corresponding to the updated frame number in order to reproduce an image of the relevant frame number (#218). Waiting for a moment in Step #219 while the above operations are carried out, the display window 106 is operated to monitor the image information corresponding to the current frame number (#220). Then, this routine returns to Step #216, the frame number is decremented by one when the access switch SW is pressed and the corresponding image is presented on the display window 106. This routine repeats these steps each time the access switch SW is pressed. On the other hand, in Step #222, it is checked whether the access switch SW is in ON-state. When the access switch SW is an ON-state, this routine returns to Step #216. When the access switch SW is in an OFF-state (No in Step #222), this routine proceeds to Step #250.

In Step #250, it is checked whether the erasure switch SE is turned on. When the erasure switch SE is turned on (Yes in Step #250), the image currently monitored on the display window 106 is erased from the IC card 110 or internal memory 405 (#251). Then, this routine returns to Step #203. If, however, the erasure switch SE is not turned on (No in Step #250), this routine proceeds to Step #223 and it is checked whether the start switch SR is turned on.

If the start switch SR is not turned on (No in Step #223), it is determined that printout is not required, this routine returns to Step #203 and repeats the above steps. On the contrary, if the start switch SR is turned on (Yes in Step #223), a print command signal is output to the processor in the unit 302 (#224) to start printout operation. On receiving this signal, the processor causes the printer section to start printing. An indication that printout operation is being executed is presented on the indicator 117 while the printout operation is executed (#225, #226). Subsequently, this routine waits until the printout operation is completed in Step #227 and a print end indicator is lit (#228) when a print end signal is output (Yes in Step #227). After printing one image frame through the above processes, this routine returns to Step #203.

On the other hand, if the switch SP is not turned on in Step #207, it is determined that printout is not required and this routine proceeds to Step #229. In Step #229, it is checked whether the switch SV for reproduction on the TV is in ON-state. If the switch SV for reproduction on the TV is not an in ON-state (No in Step #229), it is determined that reproduction of image on the TV screen is not required and this routine proceeds to Step #241. On the contrary, if the switch SV for reproduction on the TV is in an ON-state (Yes in Step #229), this routine proceeds to Step #231 via Step #230.

In this reproduction mode, it is checked whether the access switch ST or SW is pressed (#231, #236). When the access switch ST is in an ON-state (Yes in Step #231), the frame number is incremented by one and displayed. On the other hand, the address controller 421 outputs the address data corresponding to the updated frame number in order to reproduce the image of the relevant frame number (#232, #233). Subsequently, the TV is operated to monitor the image information corresponding to the current frame number (#234) in the same manner as explained earlier. Then, this routine returns to Step #231 and repeats these steps each time the access switch ST is pressed. On the other hand, in Step #235, it is checked whether the access switch ST is in an ON-state. When the access switch ST is in an ON-state (Yes in Step #235), this routine returns to Step #231. When the access switch ST is in an OFF-state (No in Step #235), this routine proceeds to Step #236.

Next, this routine proceeds to Step #237 when the access switch SW is in an ON-state (Yes in Step #236) instead of the access switch ST. This routine proceeds to Step #240 when the access switch SW maintains its state or is turned off (No in Step #236).

In Step #236, it is determined that the access switch SW is pressed, the frame number is decremented by one and is displayed. Simultaneously, the address controller 421 outputs the address data corresponding to the updated frame number in order to reproduce an image of the relevant frame number (#238). Subsequently, the image information corresponding to the current frame number (#239) is presented on the TV screen in the same manner as explained earlier. Then, this routine returns to Step #236. This routine repeats these steps each time the access switch SW is pressed. In Step #240, it is checked whether the access switch SW is in an ON-state. This routine returns to Step #236 when the access switch SW is in an ON-state (Yes in Step #240). This routine proceeds to Step #252 when the access switch SW is in an OFF-state (No in Step #240).

In Step #252, it is checked whether the erasure switch SE is in an ON-state. When the erasure switch SE is in an ON-state (Yes in Step #252), the image currently monitored on the TV screen is erased from the IC card 110 or internal memory 405 (#253). Then, this routine returns to Step #203. If, however, the erasure switch SE is not in an ON-state (No in Step #252), this routine returns directly to Step #203.

Steps after Step #241 show a checking routine for the access switches ST and SW when the camera is set in the photography mode. When the access switch ST is in an ON-state (Yes in Step #241), the focal distance of the object lens 102 is set to the telephoto position (#242). When the access switch SW is in an ON-state (Yes in Step #243), the object lens 102 is set to the wide-angle position (#244). If both the access switches ST and SW are in an OFF-state, the object lens 102 is left at a current focal position. At the end of the above interrupt routine, it is checked whether the uncharged flag is set to "1" (#245). If the uncharged flag is set to "1", this routine resumes the charging process (#246), which is interrupted when the interrupt operations are executed without fully charging the capacitor of the electronic flash, and returns to the main routine. If the uncharged flag is set to "0", this routine directly returns to the main routine.

Although digital memories are used as storage media in the above preferred embodiments, analog memories may be used. For example, a floppy disc may be employed instead of the IC card 110 used in the first camera. Also, in the second camera, although an internal memory is used as storage medium, it is possible to use a memory removably mountable on the camera body.

The above preferred embodiments of the present invention employ the thermal transfer printing manner. Alternatively, it is possible to use a thermal printer, sublimation type printer or melt out type printer. Also, a black and white printer may be used instead of a color printer.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera capable of recording and reproducing a photographed image, the camera comprising:

a body having an opening extending therethrough;

a taking lens which permits light from an external object to form an image of the object;

an image sensor for picking up the image formed by said taking lens;

a storage medium which stores the image picked up by said image sensor, such a stored image being the photographed image; and a reproducer which reproduces the photographed image stored in the storage medium on reproduction paper set external to the body and extending across the opening for a print operation, wherein the reproducer is substantially disposed within the body and operatively interfaces with the reproduction paper through the opening to print the photographed image.

2. A camera according to claim 1 wherein the reproducer is a printer.

3. A camera according to claim 1, further comprising:

a reproduction head of the reproducer for reproducing the photographed image on the externally set reproduction paper;

a transfer controller which transfers the photographed image from the storage medium to the reproduction head;

a driver which runs the reproduction head within the opening; and an indicator which indicates a reproducing position for the externally set reproduction paper.

4. A camera according to claim 2 wherein the printer has a thermal transfer device.

5. A camera according to claim 1 wherein the storage medium is a digital memory.

6. A camera according to claim 5 wherein the digital memory is removably mountable on the camera.

7. A camera according to claim 1 wherein the reproducer is a color printer.

8. A camera, having a body with a print opening formed therein, capable of recording and reproducing a photographed image, the camera comprising:

a taking lens which permits light from an external object to form an image of the object;

an image sensor for picking up the image formed by said taking lens;

a storage medium which stores a plurality of images picked up by said image sensor;

a selector which selects one image from the plurality of photographed images stored in the storage medium; and a printer, provided within the body, which prints the selected image through the opening on reproduction paper set external to the body and extending across the opening.

9. A camera according to claim 8, further comprising:

a reproduction head which reproduces the photographed image on the externally set reproduction paper;

a transfer controller which transfers the photographed image from the storage medium to the reproduction head;

a driver which runs the reproduction head within the opening and an indicator which indicates a reproducing position on the externally set reproduction paper.

10. A camera according to claim 8 wherein the printer has a thermal transfer device.

11. A camera according to claim 8 wherein the storage medium is a digital memory.

12. A camera according to claim 11 wherein the digital memory is removably mountable on the camera.

13. A camera according to claim 8 wherein the printer is a color printer.

14. A camera capable of recording and reproducing a photographed image, the camera comprising:

a camera body having an opening;

a reproduction paper securing lid;

a taking lens which permits light from an external object to form an image of the object;

an image sensor which is provided in said camera body for picking up the image formed by said taking lens;

a storage section which is provided in said camera body for storing the image picked up by said image sensor, such a stored image being the photographed image; and a printer section which is provided in said camera body with at least some portion disposed within said opening for printing, through said opening, the photographed image stored in the storage section on reproduction paper set external to said camera body and secured by said lid for a print operation.

15. A camera according to claim 14, wherein said printer section includes a thermal print head, a thermal transfer ink film and a supply roller and a take-up roller for the thermal transfer ink film.

16. A camera according to claim 14, wherein said lid opens and closes said opening.

17. A camera according to claim 16, further comprising:

a flat panel display window which is mounted on an outer surface of said lid.

18. A camera according to claim 16, further comprising:

a flash light aperture of an electronic flash unit which is provided at a front edge of said lid.

19. A camera capable of recording and reproducing a photographed image, the camera comprising:

a camera body having a main portion and a movable portion which is extendable from the main portion, wherein in an extended position the movable portion forms an opening;

a taking lens which permits light from an external object to form an image of the object;

an image sensor which is provided in said camera body for picking up the image formed by said taking lens;

a storage section which is provided in said camera body for storing the image picked up by said image sensor, such a stored image being the photographed image; and a printer section which is provided in said camera body for printing the photographed image stored in the storage section on reproduction paper set external to said camera body, said printer section being exposed to the external reproduction paper through said opening when in said extended position, wherein said external reproduction paper extends across said opening.

20. A camera according to claim 19, wherein said printer section includes a thermal print head, a thermal transfer ink film and a supply roller and a take-up roller for the thermal transfer ink film.

21. A camera according to claim 19, further comprising:

a printing position indicating mark which is provided on siid camera body to indicate a printing position of said printer section to an operator.

22. A camera capable of recording and reproducing an image of an object, the camera comprising:

a body having an opening in an upper surface thereof;

an image sensor to pick up an image of an object; and a reproducer which reproduces a picked up image on reproduction paper set external to the body and extending across the opening for a print operation, wherein the reproducer is substantially disposed within the body and operatively interfaces with the reproduction paper through the opening to print the picked up image.

23. A camera in accordance with claim 22, wherein the reproducer includes:

a reproduction head, which interfaces with the reproduction paper, to reproduce a picked up image; and a driver to drive the reproduction head.

24. A camera in accordance with claim 22, wherein the reproducer is a thermal transfer device.

25. A camera in accordance with claim 22, further comprising a storage memory, coupled between the image sensor and the reproducer, to store a picked up image and provide a stored image to the reproducer.

26. A camera in accordance with claim 25, wherein the storage memory is removably mounted.

27. A camera capable of recording and reproducing a photographed image, the camera comprising:

a camera body having an opening on an upper surface thereof;

a reproduction paper securing lid positioned adjacent to the opening;

an image sensor which is provided in the camera body to pick up an image of an object; and a printer section which is substantially provided in said camera body with at least some portion disposed within said opening for printing through said opening a picked up image on reproduction paper set external to the camera body and secured by the lid for a print operation.

28. A camera in accordance with claim 27, wherein the printer section includes a thermal print head, and a thermal transfer ink film extending between a supply roller and a take-up roller.

29. A camera in accordance with claim 27, wherein the lid opens and closes said opening.

30. A camera in accordance with claim 27, wherein the camera body includes a printing position indicating mark to indicate a printing position for a reproduction paper.

31. A camera in accordance with claim 27, wherein the camera body has a main portion and a movable portion, where the moveable portion can be received within the main portion as well as extended therefrom, wherein the opening and printer section are included within the moveable portion.

32. A camera capable of recording and reproducing an image of an object, the camera comprising:

a body having an opening;

an image sensor to pick up an image of an object;

a controller; and a reproducer, disposed within the body and coupled to the controller, to reproduce a picked up image on reproduction paper set external to the body and extending across the opening for a print operation, wherein the controller controls the reproducer to selectively extend into the opening to engage a set reproduction paper to reproduce a picked up image.

33. A camera in accordance with claim 32, wherein the reproducer includes:

a reproduction head, which interfaces with the reproduction paper, to reproduce a picked up image; and a driver to drive the reproduction head.

34. A camera in accordance with claim 32, wherein the reproducer is a thermal transfer device.

35. A camera in accordance with claim 32, further comprising a storage memory, coupled between the image sensor and the reproducer, to store a picked up image and provide a stored image to the reproducer.

36. A camera in accordance with claim 35, wherein the storage memory is removably mounted.

37. A camera capable of recording and reproducing a photographed image, the camera comprising:

a camera body having an opening;

a reproduction paper securing lid positioned adjacent to the opening;

an image sensor which is provided in the camera body to pick up an image of an object;

a controller; and a printer section, substantially disposed within the body and coupled to the controller, to print a picked up image on reproduction paper set external to the camera body and secured by the lid for a print operation, wherein the controller controls the printer section to selectively extend into the opening to engage a set reproduction paper to reproduce a picked up image.

38. A camera in accordance with claim 37, wherein the printer section includes a thermal print head, and a thermal transfer ink film extending between a supply roller and a take-up roller.

39. A camera in accordance with claim 37, wherein the lid opens and closes said opening.

40. A camera in accordance with claim 37, wherein the camera body includes a printing position indicating mark to indicate a printing position for a reproduction paper.

41. A camera in accordance with claim 37, wherein the camera body has a main portion and a movable portion, where the moveable portion can be received within the main portion as well as extended therefrom, wherein the opening and printer section are included within the moveable portion.

* * * * *